United States Patent
Costa et al.

(10) Patent No.: US 8,122,436 B2
(45) Date of Patent: Feb. 21, 2012

(54) PRIVACY ENHANCED ERROR REPORTS

(75) Inventors: Manuel Costa, Cambridge (GB);
Miguel Castro, Cambridge (GB);
Jean-Philippe Martin, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1131 days.

(21) Appl. No.: 11/941,272

(22) Filed: Nov. 16, 2007

(65) Prior Publication Data
US 2009/0132861 A1      May 21, 2009

(51) Int. Cl.
*G06F 9/44*      (2006.01)

(52) U.S. Cl. ........ 717/128; 717/124; 717/126; 717/127; 717/129; 714/38.1; 712/223

(58) Field of Classification Search ................. None
See application file for complete search history.

(56) References Cited

U.S. PATENT DOCUMENTS

| | | | |
|---|---|---|---|
| 5,317,740 A * | 5/1994 | Sites | 717/129 |
| 5,465,355 A * | 11/1995 | Cook et al. | 710/38 |
| 5,790,778 A | 8/1998 | Bush et al. | 714/38.1 |
| 6,182,243 B1 * | 1/2001 | Berthe et al. | 714/38.11 |
| 6,266,788 B1 | 7/2001 | Othmer et al. | |
| 6,629,267 B1 | 9/2003 | Glerum et al. | |
| 6,701,514 B1 * | 3/2004 | Haswell et al. | 717/115 |
| 6,952,779 B1 | 10/2005 | Cohen et al. | |
| 7,024,409 B2 * | 4/2006 | Iyengar | 1/1 |
| 7,178,166 B1 | 2/2007 | Taylor et al. | |
| 7,237,265 B2 | 6/2007 | Reshef et al. | |
| 7,284,274 B1 | 10/2007 | Walls et al. | |
| 7,380,171 B2 * | 5/2008 | Prescott et al. | 714/38.11 |
| 7,587,636 B2 * | 9/2009 | Tillmann et al. | 714/33 |
| 7,979,844 B2 * | 7/2011 | Srinivasan | 717/119 |
| 2003/0208457 A1 * | 11/2003 | Iyengar | 707/1 |
| 2005/0028036 A1 * | 2/2005 | Shibata | 714/38 |
| 2005/0198527 A1 | 9/2005 | Johnson et al. | |
| 2005/0289404 A1 | 12/2005 | Maguire | |
| 2006/0021054 A1 | 1/2006 | Costa et al. | |
| 2006/0031933 A1 | 2/2006 | Costa et al. | |
| 2006/0136784 A1 | 6/2006 | Prescott et al. | |
| 2006/0190770 A1 | 8/2006 | Harding | |
| 2006/0253739 A1 * | 11/2006 | Godefroid et al. | 714/38 |
| 2006/0277539 A1 | 12/2006 | Amarasinghe et al. | |
| 2006/0282897 A1 | 12/2006 | Sima et al. | |

(Continued)

FOREIGN PATENT DOCUMENTS

WO    WO0074193 A1    12/2000

OTHER PUBLICATIONS

Title: Compression techniques to simplify the analysis of large execution traces, author: Hamou-Lhadj, A et al, source: IEEE, dated Dec. 10, 2002.*

(Continued)

*Primary Examiner* — Chameli Das
(74) *Attorney, Agent, or Firm* — Lee & Hayes, PLLC

(57) ABSTRACT

Methods and apparatus for generating error reports with enhanced privacy are described. In an embodiment the error is triggered by an input to a software program. An error report is generated by identifying conditions on an input to the program which ensure that, for any input which satisfies the conditions, the software program will follow the same execution path such that the error can be reproduced. The error report may include these conditions or may include a new input generated using the conditions.

19 Claims, 15 Drawing Sheets

U.S. PATENT DOCUMENTS

| | | | |
|---|---|---|---|
| 2007/0011741 A1 | 1/2007 | Robert et al. | |
| 2007/0067848 A1 | 3/2007 | Gustave et al. | |
| 2007/0074149 A1 | 3/2007 | Ognev et al. | |
| 2008/0134148 A1* | 6/2008 | Clark | 717/128 |
| 2008/0295081 A1* | 11/2008 | Albot et al. | 717/128 |
| 2009/0125887 A1* | 5/2009 | Kahlon et al. | 717/126 |
| 2010/0198799 A1* | 8/2010 | Krishnan et al. | 707/702 |

OTHER PUBLICATIONS

Title: System evolution tracking through execution trace analysis, author: Fischer, M, source: IEEE, dated: May 15, 2005.*

Berger, et al., "Diehard: Probabilistic Memory Safety for Unsafe Languages", ACM, 2005, pp. 10.

Bhansali, et al., "Framework for Instruction-Level Tracing and Analysis of Program Executions", VEE, Jun. 2006, pp. 10.

Broadwell, et al., "Scrash: A System for Generating Secure Crash Information", available at least as early as Aug. 20, 2007, at <<http://66.102.9.104/search?q=cache:9Ph8UzKMqLEJ:www.cs.berkeley.edu/~nks/scrash/scrash-usenix.pdf+Maintain+data+privacy+in+generating+bug+reports&hi=en&ct=clnk&cd=2&gi=uk>>, pp. 1.

Brumley, et al., "Towards Automatic Generation of Vulnerability Signatures", May 2006, pp. 15.

Cadar, et al., "Exe: Automatically Generating Inputs of Death", ACM, Oct. 2006, pp. 14.

Castro, et al., "Securing Software by Enforcing Data-Flow Integrity", Nov. 2006, pp. 10.

Costa, at al., "Bouncer: Securing Software by Blocking Bad Input", ACM, Oct. 2007, pp. 14.

Crandall, et al., "On Deriving Unknown Vulnerabilities From Zero-Day Polymorphic and Metamorphic Worm Exploits", ACM, Nov. 2005, pp. 14.

Dutertre, et al., "A Fast Linear-Arithmetic Solver for DPLL(T)", Aug. 2006, pp. 75.

Elnozahy, et al., "A Survey of Rollback-Recovery Protocols in Message-Passing Systems", Sep. 2002, pp. 44.

Engler, et al., "Under-constrained Execution: Making Automatic Code Destruction Easy and Scalable", at <<http://www.stanford.edu/~engler/issta07v-engler.pdf>>, ACM, Jul. 9-12, 2007, pp. 4.

Godefroid, et al., "DART: Directed Automated Random Testing", ACM, Jun. 12-15, 2005, pp. 11.

Jhala, et al., "Path Slicing", ACM, Jun. 2005, pp. 10.

Sweeney, "k-Anonymity: A Model for Protecting Privacy", International Journal on Uncertainty, Fuzziness and Knowl.-Based Syst., May 2002, pp. 557-570.

Qin, et al., "Rx: Treating Bugs As Allergies—A Safe Method to Survive Software Failures", ACM, Nov. 2005, pp. 14.

Rushby, "Automated Test Generation and Verified Software?", at <<http://www.csi.sri.com/users/rushby/papers/vstte07.pdf>>, IFIP, 2007, pp. 11.

Ruwase, et al., "A Practical Dynamic Buffer Overflow Detector", Feb. 2004, pp. 11.

Samarati, et al., "Generalizing Data to Provide Anonymity When Disclosing Information", ACM, 1998, pp. 1.

Sen, et al., "CUTE: A Concolic Unit Testing Engine for C", ACM, 2005, pp. 10.

"Submitting Bug Reports", available at least as early as Aug. 20, 2007, at <<http://java.sun.com/javase/6/webnotes/trouble/TSG-Desktop/html/bugreports.html>>, pp. 6.

Tucek, et al., "Automatic On-line Failure Diagnosis at the End-User Site", available at least as early as Aug. 20, 2007, at <<http://www.usenix.org/events/hotdep06/tech/prelim_papers/tucek/tucek.pdf>>, pp. 6.

"YICES: An SMT Solver", retrieved on Oct. 29, 2007, at <<http://yices.csl.sri.com>>, pp. 1.

"Z3 An Efficient SMT Solver", retrieved on Oct. 29, 2007, at <<http://research.microsoft.com/projects/z3/.>>, pp. 1.

Zeller, "Simplifying and Isolating Failure-Inducing Input", at <<http://www.cs.purdue.edu/homes/jv/510s05/papers/puff.pdf>>, IEEE, vol. 28, No. 2, Feb. 2002, pp. 17.

Castro, et al., Better Bug Reporting with Better Privacy, ASPLOS 2008, Mar. 1-5, 2008, 10 pages.

Office Action U.S. Appl. No. 11/625,575, mailed on Aug. 17, 2011, 15 pgs.

Abadi, et al., "Control-flow Integrity: Principles, Implementations, and Applications", ACM, 2005, pp. 14.

Agrawal, et al., "Dynamic Program Slicing", ACM SIGPLAN, vol. 25, No. 6, Jun. 1990, pp. 246-256.

Barnett, et al., "Weakest-Precondition of Unstructured Programs", pp. 8, Dated: Sep. 2005.

Brumley, et al., "Creating Vulnerability Signatures Using Weakest Pre-Conditions", IEEE, 2007, pp. 15.

Cadar, et al., "Exe: Automatically Generating Inputs of Death", ACM, 2006, pp. 14.

Chen, et al., "Defeating Memory Corruption Attacks Via Pointer Taintedness Detection", pp. 10, Jul. 2005.

Chen, et al., "Non-Control-Data Attacks Are Realistic Threats", pp. 15, Jul. 2005.

Costa, et al., "End-To-End Containment of Internet Worm Epidemics", University of Cambridge, Oct. 2006, pp. 140.

Costa, et al., "Vigilante: End-To-End Containment of Internet Worms", ACM, Oct. 2005, pp. 15.

Cowan, et al., "Stackguard: Automatic Detection and Prevention of Buffer-Overrun Attacks", USENIX, 1998, pp. 63-77.

Cui, et al., "Shieldgen: Automatic Data Patch Generation for Unknown Vulnerabilities With Informed Probing", pp. 15, May 2007.

Dijkstra, et al., "Guarded Commands, Nondeterminacy and Formal Derivation of Programs", Association for Computing Machinery, Inc., 1975, pp. 453-457.

Godefroid, "Compositional Dynamic Test Generation", ACM, Jul. 14, 2006, pp. 12.

Kephart, et al., "Automatic Extraction of Computer Virus Signatures", retrieved on Sep. 17, 2007, at <<http://66.102.1.104/scholar?hl=en&lr=&q=cache:-MEW6AL9N4IJ:WWW1.cs.columbi...>>, pp. 22.

Kim, et al., "Autograph: Toward Automated, Distributed Worm Signature Detection", pp. 16, Aug. 2004.

King, et al., "Symbolic Execution and Program Testing", Association for Computing Machinary, Inc., 1976, pp. 385-394.

Kiriansky, et al., "Secure Execution Via Program Shepherding", USENIX, 2002, pp. 16.

Kreibich, et al., "Honeycomb—Creating Intrusion Detection Signatures Using Honeypots", pp. 6, Nov. 2003.

Liang, et al., "Automatic Generation of Buffer Overflow Signatures: An Approach Based on Program Behavior Models", pp. 10, Dec. 2005.

Liang, et al., "Fast and Automated Generation of Attack Signatures: A Basis for Building Self-Protecting Servers", ACM, 2005, pp. 10.

Moore, et al., "Inside the Slammer Worm", IEEE, 2003, pp. 33-39.

Newsome, et al., "Dynamic Taint Analysis for Automatic Detection, Analysis, and Signature Generation of Exploits on Commodity Software", retrieved onAug. 13, 2007, at <<http://64.233.183.104/search?q=cache:6DAtFyhOY98J:valgrind.org/docs/newsome2005.pdf+Dynamic+Taint+Analysis+for+Automatic+Detection,+Analysis,+and+Signature+Generation+of+Exploits+on+Commodity+Software&hl=en&ct=clnk&cd=1 >>, pp. 14, Aug. 13, 2007, Newsome, et al., "Polygraph: Automatically Generating Signatures for Polymorphic Worms", pp. 16, May 2005.

Newsome, et al., "Vulnerability-Specific Execution Filtering for Exploit Prevention on Commodity Software", pp. 14, Feb. 2006.

"Phoenix Framework", at <<http://research.microsoft.com/phoenix/phoneixrdk.aspx>>, Microsoft Corporation, 2007, pp. 2.

Rinard, et al., "Enhancing Server Availability and Security Through Failure-Oblivious Computing", pp. 14, Dec. 2004.

Singh, et al., "Automated Worm Fingerprinting", pp. 16, Dec. 2004.

Toth, et al., "Accurate Buffer Overflow Detection Via Abstract Payload Execution", Distributed Systems Group, Apr. 30, 2002, pp. 18.

Wang, et al., "Shield: Vulnerability-Driven Network Filters for Preventing Known Vulnerability Exploits", at <<http://research.microsoft.com/research/shield/papers/81.pdf>>, Feburary 2004, pp. 14.

Wang, et al., "Sigfree: A Signature-Free Buffer Overflow Attack Blocker", pp. 16, Aug. 2006.
Weimer, et al., "Finding and Preventing Runtime Error Handling Mistakes", ACM, 2004, pp. 13.
Weiser, "Program Slicing", IEEE, 1981, pp. 439-449.

Zhang, et al., "Cost Effective Dynamic Program Slicing", ACM, 2004, pp. 13.

* cited by examiner

PRIVACY ENHANCED ERROR REPORTS

BACKGROUND

In order to improve the quality of their software, software vendors collect error reports from their customers. These error reports may be automatically generated by the software when an error occurs and the user may then be given the option to send the report to the vendor or not. In order for these reports to be of most use to the vendors in analyzing and fixing a bug, the reports should contain the inputs which made the software fail. However, vendors rarely include these inputs in an error report because they may contain private user data. Instead, error reports usually contain dumps of small regions of memory, such as the memory in the stacks of running threads. However, in many cases, these dumps are not sufficient to enable the vendor to reproduce the bug and may still contain private information.

The embodiments described below are not limited to implementations which solve any or all of the disadvantages of known error reports and error reporting systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and apparatus for generating error reports with enhanced privacy are described. In an embodiment the error is triggered by an input to a software program. An error report is generated by identifying conditions on the input to the program which ensure that, for any input which satisfies the conditions, the software program will follow the same execution path such that the error can be reproduced. The error report may include these conditions or may include a new input generated using the conditions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
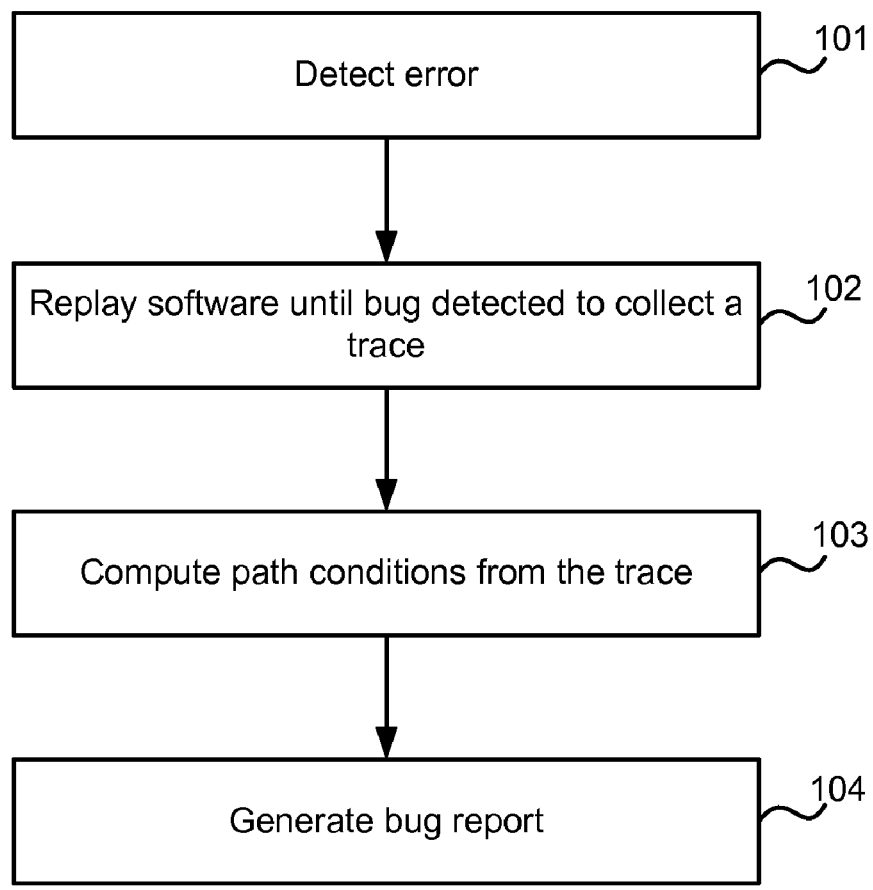
FIG. 1 is a flow diagram of an example method of generating an error report.

FIG. 1 is a flow diagram of an example method of generating an error report (also referred to as a bug report). In order to be able to generate error reports automatically, inputs to a software program need to be logged whilst the software runs. When an error is detected (in block 101), the previously logged input is used to replay the software (referred to herein as the 'faulty program') until the bug is detected and a trace is collected during the replay (block 102). The trace contains a series of instructions (e.g. x86 instructions) executed from the point at which the input was received to the point where the error (or bug) was detected. The trace is then used to generate path conditions (block 103). These path conditions comprise a set of conditions on the input to the faulty program which ensure that, for any input satisfying the conditions, the faulty program will follow the same execution path to the point where the bug was detected. These conditions may be generated using symbolic execution, as described in more detail below. From the path conditions, an error report is generated (block 104). This error report may include the path conditions, or alternatively the error report may include an input which meets the path conditions but is not the same as the actual input which caused the error (detected in block 101). These two alternatives and the steps of the method are described in more detail below.

The resultant error report (generated in block 104) includes very little personal data whilst enabling a software vendor to re-create, and therefore analyze, the error. Furthermore, as the error report contains little sensitive data, the report can be stored by the vendor without the stringent controls that would otherwise be required and the error report can be made available to a wider community within the software vendor. This improves the analysis which may be performed on any error.

Existing techniques may be used to log inputs and to detect errors (block 101). In an example, error reporting technology developed by Microsoft® may be used which detects errors using a combination of hardware, operating system, compiler inserted and application specific error checking. Other techniques include those described in the paper entitled 'A survey of rollback-recovery protocols in message-passing systems' by E. Elnozahy et al and published in ACM Computing Surveys in September 2002.

The execution trace may be generated (in block 102) using Nirvana, a runtime framework for trace collection, developed by Microsoft® and described in a paper entitled 'Framework for Instruction-level Tracing and Analysis of Program Executions' by Sanjay Bhansali, Wen-Ke Chen, Stuart de Jong, Andrew Edwards, Ron Murray, Milenko Drinic, Darek Mihocka, and Joe Chau, and published at Virtual Execution Environments Conference, 2006. A trace generated using Nirvana comprises the sequence of x86 instructions executed by each thread and the concrete values of source and destination operands for each instruction. In other examples, alternative trace generation methods may be used. Instead of comprising a sequence of instructions executed and the concrete values of source and destination operands for each instruction, the trace may comprise the state of the processor and memory when the message is received, from which the values of the operands may be computed.

In a variation of the method shown in FIG. 1, the trace could be generated automatically as the software runs normally and as a result it would not be necessary to replay the software's execution to generate the trace (block 102 would be omitted). However, this may add a high degree of overhead to the software program which, dependent on the particular circumstances (e.g. the regularity with which errors are detected) may not be justified.

The path conditions may be computed (in block 103) using forward symbolic execution on the trace (e.g. on the sequence of x86 instructions collected during replay). Forward symbolic execution computes symbolic values for storage locations that are data dependent on the input and concrete values are computed for those that are not data dependent on the input. Initially only input bytes (i.e. the bytes in the logged input) have symbolic values: the byte at index i gets symbolic value $b_i$. The instructions in the trace are then executed sequentially, keeping track of the symbolic value of storage locations that are data dependent on the input, where the symbolic values are expressions whose value depends on some of the $b_i$. Instructions with at least one symbolic operand are executed symbolically and the value of the destination operand also becomes symbolic. For example, if 'input' points to a buffer with the original input bytes, register 'eax' has symbolic value $b_0+1$ after executing:

movzx eax, input;
add eax, 1.

When all instruction operands are concrete, the instruction is executed concretely and the value of the destination operand becomes concrete.

The symbolic execution defines a total order on the instructions in the trace that is a legal uniprocessor schedule. The instructions are processed one at a time in this total order. If the next instruction to be processed has at least one source operand that references a storage location with a symbolic value, the instruction is executed symbolically. Otherwise, any storage locations modified by the instruction are marked as concrete, that is, any symbolic value these locations may have had is deleted because they are no longer data dependent on the input.

The symbolic values may be represented as trees whose interior nodes are x86 instruction opcodes and whose leaves are constants or one of the $b_i$. This particular representation is only one possible example representation.

Conditions may generated by symbolic execution in three different situations:

a. when a branch instruction is executed
b. when an indirect call or jump is executed
c. when a load or store to memory is executed with an address operand that has a symbolic value.

These three situations and the generated conditions are described in more detail below with reference to following example trace:

| | |
|---|---|
| mov | eax,dword ptr [msg] |
| movsx | eax,byte ptr [eax] |
| cmp | eax,0 |
| jg | ProcessMessage+25h (401045h) |

Whenever the symbolic execution encounters a branch that depends on the input (i.e. the branch instruction tests a flag with a symbolic value), it adds a path condition to ensure that inputs that satisfy the path conditions follow the same execution path (i.e. the execution path in the trace). If in the trace, the path is taken, the condition is one that ensures that the path is taken, and vice versa. The condition may be of the form $f_s=f_c$, where $f_s$ is the symbolic value of the flag and $f_c$ is the concrete value of the flag observed at the branch point in the execution trace. For example, if 'jz label' is executed and the zero flag has symbolic value cmp $b_0$, 0x4, the condition '$b_0=0x4$' is generated if the branch was taken in the trace or the condition '$b_0 \neq 0x4$' is generated if the branch was not taken. No conditions are added for branches that do not depend on the input.

In an example representation, conditions may be represented as a tree of the form: (Jcc f), where f is the symbolic value of eflags and a branch is dependent upon the input if the value of eflags is symbolic. If the branch is taken in the trace, Jcc is the opcode of the branch instruction. Otherwise, Jcc is the opcode of the branch instruction that tests the negation of the condition tested in the trace. For example when the last instruction in the example trace above is executed, symbolic execution generates the condition (jg (cmp (movsx $b_0$) 0)), where 'jg' is an instruction to 'jump if greater than'. If the branch had not been taken in the trace, the condition would be (jle (cmp (movsx $b_0$) 0)), where 'jle' is an instruction to 'jump if less than or equal', i.e. the opposite of 'jg'.

Symbolic execution also generates conditions when an indirect call or jump is executed and the value of the target operand is symbolic. The condition in this case is of the form $t_s=t_c$ where $t_s$ is the symbolic value of the target and $t_c$ is the concrete value of the target retrieved from the trace (before the control transfer). In an example, the condition may be represented as (je (cmp $t_s$ $t_c$)), where 'je' is an instruction to 'jump if equal'. An example of code that may cause this condition to generated is:

jmp eax

If eax is symbolic, a path condition will be generated that requires that symbol to be equal to its concrete value.

Similar conditions are generated when a load or store to memory is executed and the address operand has a symbolic value. These conditions are of the form $a_s=a_c$ where $a_s$ is the symbolic value of the address operand and $a_c$ is its concrete value retrieved from the trace (before the instruction is executed). In an example, the condition may be represented as (je (cmp $a_s$ $a_c$)). An example of code that may cause this condition to generated is:

mov eax, dword ptr [edx+0Ch]

If edx is symbolic, this will generate a path condition that asserts that the symbolic expression be equal to its concrete value. A technique to generate weaker conditions in this case is described in a paper by C. Cadar, V. Ganesh, P. M. Pawlowski, D. L. Dill, and D. R. Engler entitled 'EXE: Automatically generating inputs of death' published at Computer and Communications Security (CCS) in October 2006. This technique may be used to reveal less information in an error report, however, in an example, the technique may be applied only to common library functions like strtok and sscanf.

As described above, a trace may comprise the sequence of instructions executed by each thread and the concrete values of source and destination operands for each instruction. These concrete values may be used in the symbol execution, for example, when comparing the content of a memory location against a constant, the concrete values may be used to identify the location (to identify which input byte influenced it) and the constant (to create the constraint on that input byte).

The use of symbolic execution to compute path conditions may be described with reference to the following example faulty code, which is a simplified web server with a buffer overflow error:

```
int ProcessMessage(int sock, char *msg) {
    char url[20];
    char host[20];
    int i=0;
    if (msg[0] != 'G' || msg[1] != 'E' || msg[2] != 'T' || msg[3] != ' ')
        return −1;
    msg = msg+4;
    while (*msg != '\n' && *msg != ' ') {
        url[i++] = *msg++;
    }
    url[i] = 0;
    GetHost(msg, host);
    return ProcessGet(sock, url, host);
}
```

In this code, the function ProcessMessage is called immediately after the message msg is received from the network. If the message contains a GET request, the function copies the URL to the array url, obtains the name of the target host, and calls ProcessGet to handle the request. However, a message with a long URL can overflow url (which as defined in the second line of the code is only 20 characters long) and corrupt the stack. This faulty code example may be compiled with Microsoft® Visual Studio® 2005 with the option that inserts canaries to detect stack overflows.

In an example, the following HTTP GET request may be sent to the web server (the faulty program):

```
GET/checkout?product=exampleProduct&name=
JohnDoe&creditcardnumber =1122334455667788 HTTP/1.1
Accept: */*
Accept-Language: en-gb
UA-CPU: x86
Accept-Encoding: gzip, deflate
User-Agent: Mozilla/4.0 (compatible; MSIE 7.0; Windows NT 5.1;
.NET CLR
1.1.4322; .NET CLR 2.0.50727)
Host: www.ecommercesite.com
Connection: Keep-Alive
```

The URL within the request above includes private data (e.g. a product name, a customer name and a credit card number). This long URL overflows the url array and overwrites the return address of ProcessMessage on the stack. The compiler inserted checks detect the error when ProcessMessage returns. If as a result of the error being detected, a stack dump was used to provide an error report to the software vendor, the private data would be included within the error report.

A fragment of the trace which would be obtained by sending the request above to the web server also given above, and which corresponds to msg[0] !='G' || msg[1]!='E' in the source code is as follows:

| | |
|---|---|
| 00401037 mov | eax,dword ptr [ebp+0Ch] |
| 0040103A movsx | ecx,byte ptr [eax] |
| 0040103D cmp | ecx,47h |
| 00401040 jne | ProcessMessage+46h (401066h) |
| 00401042 mov | edx,dword ptr [ebp+0Ch] |
| 00401045 movsx | eax,byte ptr [edx+1] |
| 00401049 cmp | eax,45h |
| 0040104C jne | ProcessMessage+46h (401066h) |

The first instruction loads the address of the message from the stack to eax and the second loads the first byte of the message (with sign extension) to ecx. Therefore, ecx has symbolic value $b_0$ at this point. The third instruction compares ecx with 0x47 ('G') and assigns the symbolic value cmp $b_0$, 0x47 to the zero flag. Since jne is taken only if the zero flag is zero, the path condition for the fourth instruction is $b_0$=0x47 ('G'). The last four instructions in the trace extract above are similar but they check the second byte. The path condition $b_1$=0x45 ('E') is generated for the eighth instruction. While processing the rest of the trace, the additional conditions: $b_2$=0x54 ('T'), $b_3$=0x20 (' '), and $b_i$≠0xa and $b_i$≠0x20 are generated for the remaining bytes in the input URL. There are also additional conditions from execution of other instructions not shown in the trace extract above, such as the execution of GetHost and ProcessGet.

Having generated the path conditions, these may be included within an error report (block 104) which may be sent to the vendor of the faulty software. Alternatively (as described below with reference to FIG. 2), the path conditions may be used to generate a new input which can be included within the error report in addition to or instead of the path conditions. Both of these alternatives reveal the same amount of information about the original input. Sending the path conditions within the error report saves computation time at the machine which is running the faulty software (which may be referred to as the 'user's machine'), however sending a new input makes the system more resilient to a denial-of-service attack on an error reporting server (e.g. where a malicious entity sends lots of path conditions purporting to be error reports which cause the server to use computational power to determine corresponding inputs). Furthermore, as the new input is smaller than the path conditions and generally compresses better, use of a new input within the error report may save bandwidth. It may be useful in some circumstances to include both the new input and the path conditions in the error report, for example so that the input can be used immediately to reproduce the error and an analyst could look at the conditions to get a sense for the class of inputs that trigger the error.

Figure 2:
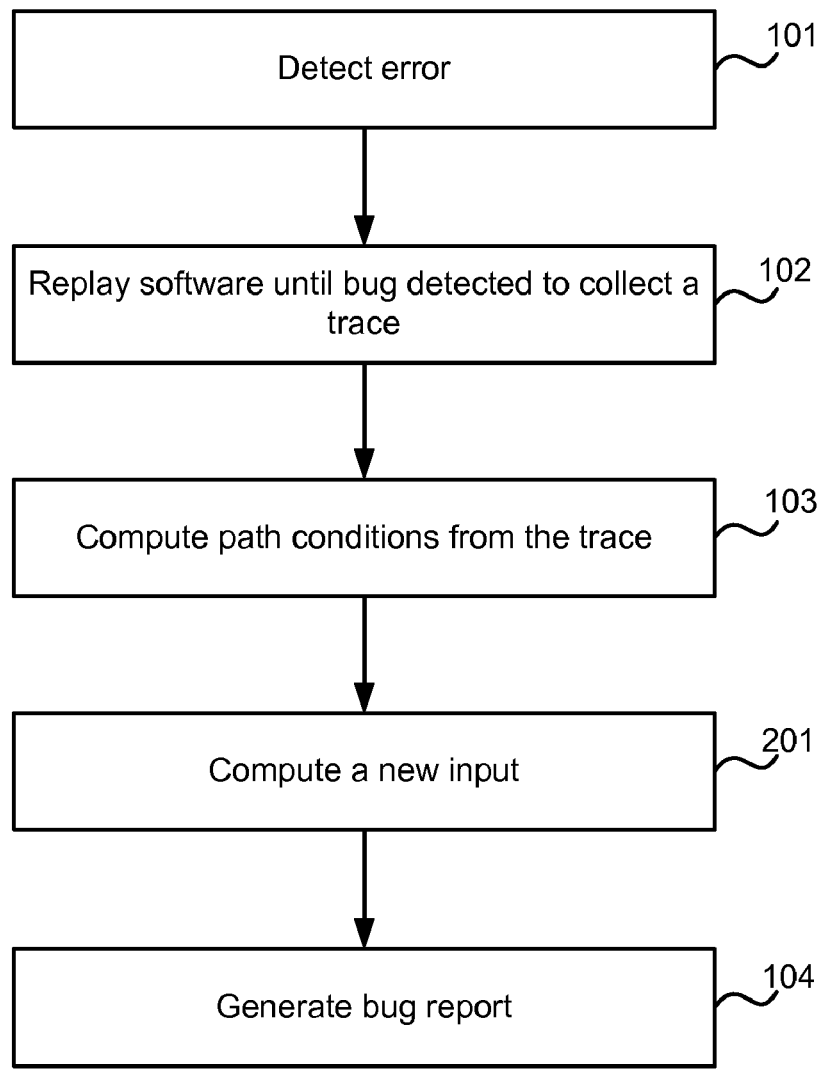
FIG. 2 is a flow diagram of another example method of generating an error report.

FIG. 2 is a flow diagram of another example method of generating an error report in which the resultant error report includes a new input. The new input is generated so that it causes the faulty software to follow the same execution path as it followed on receipt of the original input, but is otherwise unrelated to the original input. As described above in relation to FIG. 1, when an error is detected (block 101), the previously logged input is used to replay the faulty program until the bug is detected and a trace is collected during the replay (block 102). The trace is then used to generate path conditions (block 103), which in turn are used to generate a new input (block 201). This new input, which satisfies the path conditions, is included within the error report (generated in block 104). In some examples, the path conditions may also be included within the error report. The generation of a new input (block 201) is described in more detail below.

Figure 3:
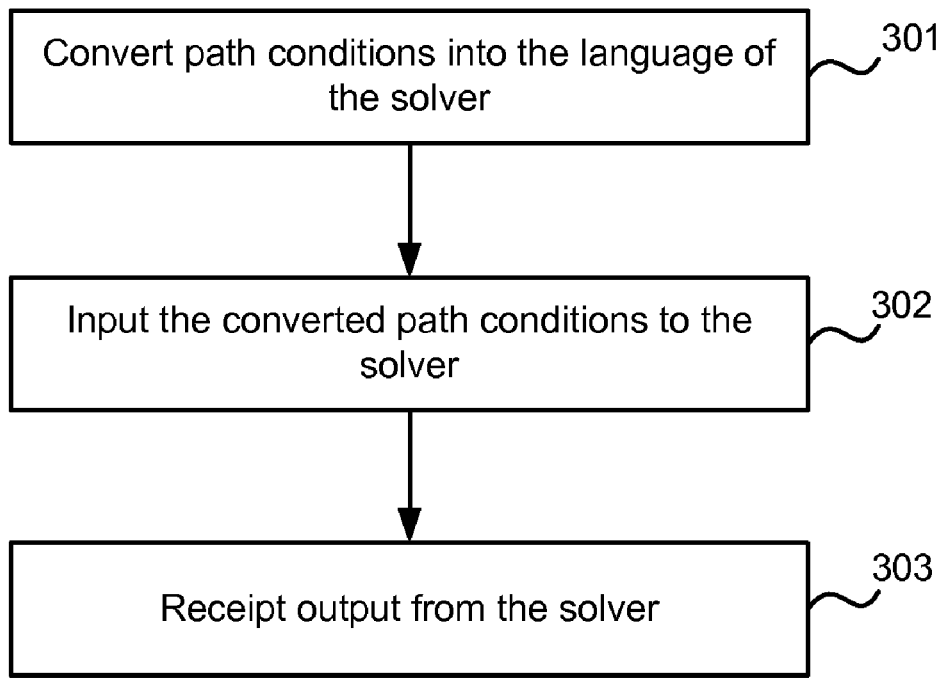
FIG. 3 is a flow diagram showing one of the steps of FIG. 2 in more detail.

The generation of a new input (block 201) uses a Satisfiability Modulo Theories (SMT) solver, such as the Z3 SMT solver developed by Microsoft®. Alternatively, other SMT solvers may be used, such as Yices. In other examples, other solvers may be used such as constraint solvers (e.g. Disolver developed by Microsoft®) and Boolean satisfiability (SAT) solvers. In further examples, constraint programming approaches or any technique for finding an input that satisfies the path conditions may be used. As shown in FIG. 3, the path conditions, which may be in x86 assembly code, are first converted into the language of the solver (block 301) and then input to the SMT solver (block 302). The SMT solver outputs the new input (block 303). It may be necessary to perform format conversion (as part of block 303 or after block 303). For example, the solver may output a list of variable assignments such as 'INPUT0=10' and the conversion may be to put value 10 in the first byte of the new input. The generation of a new input using an SMT solver is very fast and may, for example, take less than 15 seconds.

Depending on the SMT solver used, there may be some limitations on the types of path conditions that can be converted into the language of the solver (in block 301). For example, another SMT solver may not be able to convert shifts by symbolic values or floating point instructions. In such a situation, any path condition that involves these conditions may be replaced by a set of conditions stating that the input bytes involved in computing the particular path condition are equal to their concrete values in the original input.

The new inputs generated by the SMT solver compress very well for two reasons. Firstly, it is common for many input bytes to have no constraints (i.e. they do not appear in any of the path conditions) and the value zero is assigned to all these bytes. Secondly, the solver assigns the same value to input bytes that have exactly the same constraints in the path conditions, which is common because of loops. In an example, a new input generated for an example error in Microsoft® Word compressed from 2.5 MB to 5.1 KB, compared to the original input which compressed to 926 KB.

In the example given above, where the faulty program is a simplified web server, the new input comprises:

GET . . .

where '.' represents byte value zero. This input reveals nothing about the URL in the original request except that it is longer than 21 bytes. All the private information has been removed but the input is sufficient to reproduce the bug. This new input may be included within an error report (block 201) or alternatively may be generated by the software vendor on receipt of a set of path conditions in an error report.

Figure 4:
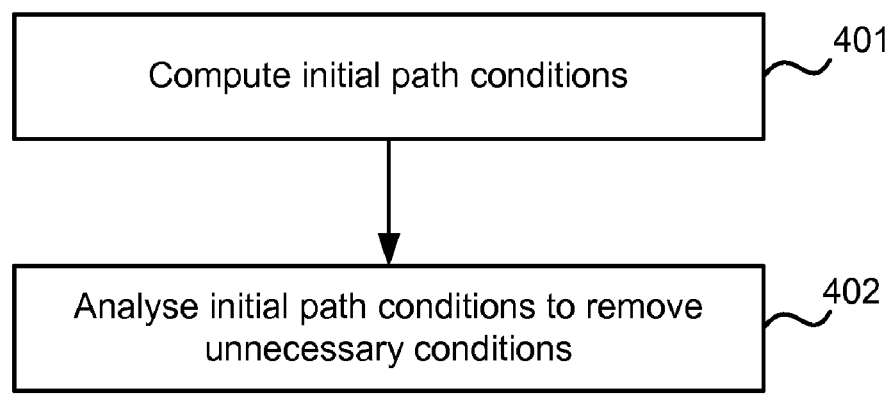
FIG. 4 is a flow diagram showing one of the steps of FIGS. 1 and 2 in more detail.

In a variation of the methods shown in FIGS. 1 and 2, additional analysis may be performed to remove unnecessary path conditions. For example as shown in FIG. 4, the step of computing path conditions (block 103) may be split into two steps: first the initial path conditions are computed (block 401) and then the initial path conditions are analyzed to produce revised path conditions by removing any unnecessary conditions (block 402). The initial path conditions may be computed (in block 401) using forward symbolic execution as described above. There are many techniques which may be used individually or in combination to remove unnecessary conditions (block 402) and a number of example techniques are described below. By reducing the number of path conditions, the amount of information revealed in error reports can be reduced, without increasing the overhead during normal execution of the software. Low overhead input logging and error detection techniques may be used during normal running of the software, with additional instrumentation only used when replaying an error (in block 102). The resultant error report (generated in block 104) may also include information about the type of analysis used during replay to allow the software vendor to reproduce the bug using the same analysis. This may be beneficial to a vendor where a tool does more than one type of analysis because different analyses will catch different bugs. By specifying which type of analysis was used, the software vendor can use the same analysis to reproduce the bug, rather than having to try each type in turn until the bug is found.

Bounds checking, data flow integrity (DFI) enforcement and path slicing are three techniques which may be used (independently or in combination with one or more other techniques) to remove unnecessary conditions during replay. DFI is described in the paper entitled "Securing software by enforcing data-flow integrity" by Miguel Castro, Manuel Costa, and Tim Harris and published in the Proceedings of the 7th USENIX Symposium on Operating Systems Design and Implementation (OSDI'06), Seattle, USA, November 2006. DFI may catch bugs earlier during replay than standard error detection techniques because it adds checks to detect memory safety violations. DFI detects memory safety violations when it reads data produced by an out-of-bounds write. In the example above, where the faulty program is a simplified web server, DFI would detect the buffer overflow when the $21^{st}$ character in the URL is written to url. As a result, all the conditions added by subsequent instructions in the trace (i.e. GetHost and ProcessGet in this example) can be eliminated and only require conditions of the form: $b_i \neq 0xa$ and $b_i \neq 0x20$ for $4 \leq i \leq 21$.

Two further techniques which may be used to remove unnecessary path conditions are described below. The first detects unsafe writes and the second deals with errors that corrupt the internal data structures in libraries where DFI does not check reads. These two techniques may be considered improvements to DFI although they may not always be applicable and they may be used independently of DFI.

Figure 5:
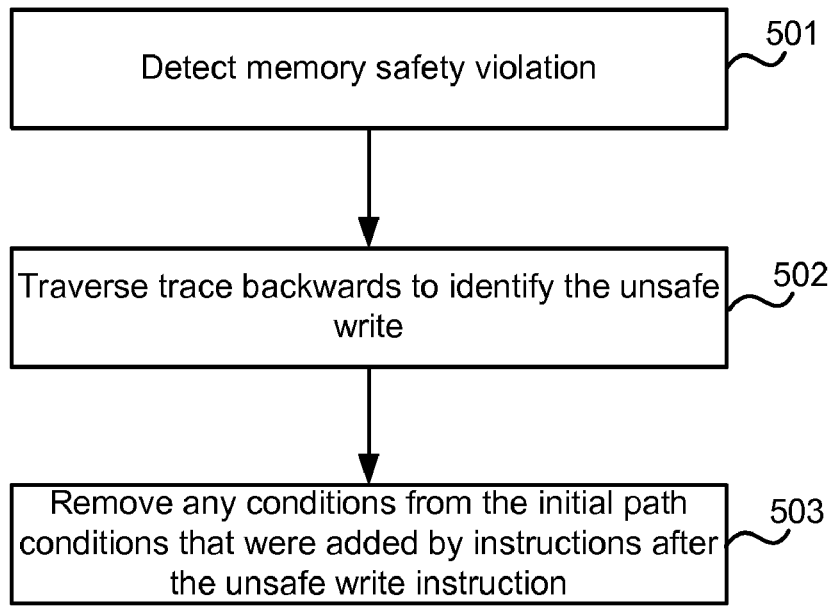
FIG. 5 is a flow diagram of an example method of detecting unsafe writes.

The first technique, which detects unsafe writes, can be described with reference to FIG. 5. On detection of a memory safety violation (block 501), e.g. on detection by DFI of a read of out-of-bounds data, the trace is traversed backwards to find the unsafe write (block 502), i.e. the write which caused the subsequent memory safety violation (e.g. the operation that wrote the data out-of-bounds). This write instruction becomes the point where the bug is detected and any path conditions added by instructions that appear later in the trace than the unsafe write (i.e. later than the new point at which the error is detected) are removed from the initial path conditions (block 503).

Many errors corrupt the heap management data structures in the C runtime libraries, which can cause library code to write anywhere in memory. Since DFI does not check reads inside libraries, it detects errors only when an instruction reads data produced by this write. The second technique involves analyzing the trace to find the instruction that first corrupts the heap management data structures. This analysis may comprise traversing the trace backwards to find the unsafe write (as in block 502). If this write was executed by one of the heap management functions (e.g. malloc), the trace is then traversed forward from the beginning to find the first read inside a heap management function (e.g. malloc, calloc or free) of a value written by an instruction which is outside one these heap management functions. Having found the read, the corresponding instruction (that wrote the value read) becomes the new point at which the error is detected and any path conditions added by later instructions in the trace are removed. Whilst this example relates to heap management data structures, the same technique could be applied to other library functions.

Path slicing is a known method of program slicing, described in a paper by R. Jhala and R. Majumdar entitled 'Path slicing' and presented at PLDI in June 2005. Path slicing uses static analysis to eliminate operations which are irrelevant towards the reachability of a target location. This technique was developed for the totally different application of examination of application verification and it has not previously been applied to the problem of generating error reports. Additionally, path slicing has previously been applied at source level; however the methods described herein apply the techniques at assembly level.

Path slicing traverses the execution trace backwards from the point at which the error is detected to compute a 'path slice', which is a subsequence of the instructions in the trace whose execution is sufficient to ensure that the error can be reproduced. The path slice contains branches whose outcome matters to the reproduction of the error and instructions that affect the outcome of those branches. Any path conditions that were added by instructions that are not in the path slice are removed from the initial path conditions.

Other techniques may be used in addition to, or instead of, path slicing to remove unnecessary conditions. Examples of suitable techniques include: precondition slicing, symbolic summaries, search for alternative exploits etc and these techniques are described in a paper by M. Costa, M. Castro, L. Zhou, L. Zhang, and M. Peinado entitled 'Bouncer: Securing Software by Blocking Bad Input' and published in the Proceedings of the 21st ACM Symposium on Operating Systems Principles (SOSP'07) in October 2007. By using techniques to remove unnecessary conditions, the amount of information revealed is reduced.

Figure 6:
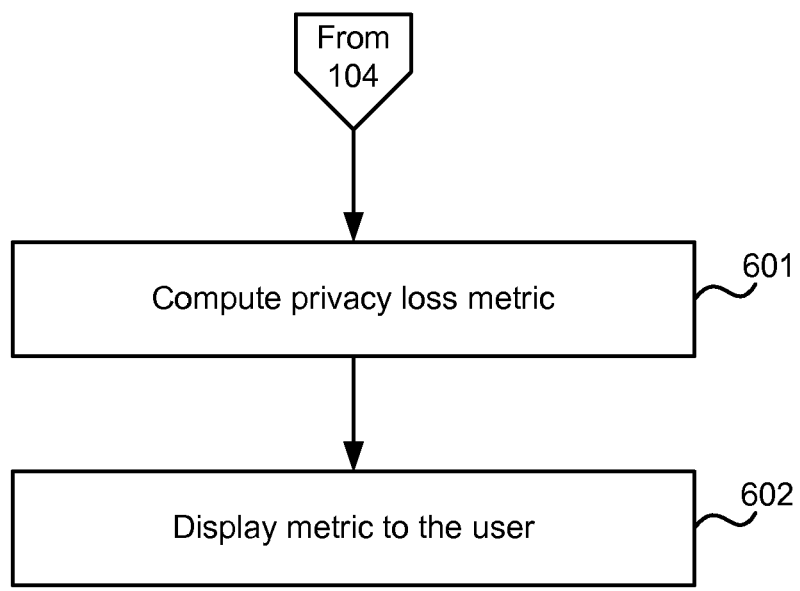
FIG. 6 is a flow diagram showing additional steps which may follow the methods shown in FIGS. 1 and 2.

The methods of FIGS. 1 and 2 may include additional steps. In an example shown in FIG. 6, the methods further comprise computing a privacy loss metric (block 601) and presenting the metric to the user (block 602). The metric provides the user with an indication of the amount of personal information which may be included in the error report and may comprise one or more of:

- an indication of the number of bits from the original input that are revealed by an error report,
- an indication of the length of the longest consecutive revealed bit string (or character string),
- an indication of the number (or fraction) of bytes which are 'essentially revealed', meaning that for those bytes at least some threshold number of bits is revealed about each such byte, and
- a map indicating, for each input byte, to what degree it is revealed.

The privacy loss metric therefore assists the user in making an informed decision as to whether to send an error report to a software vendor. Depending on the method used to generate the metric, the metric may be an exact measure, an upper bound or an estimate.

Figure 7:
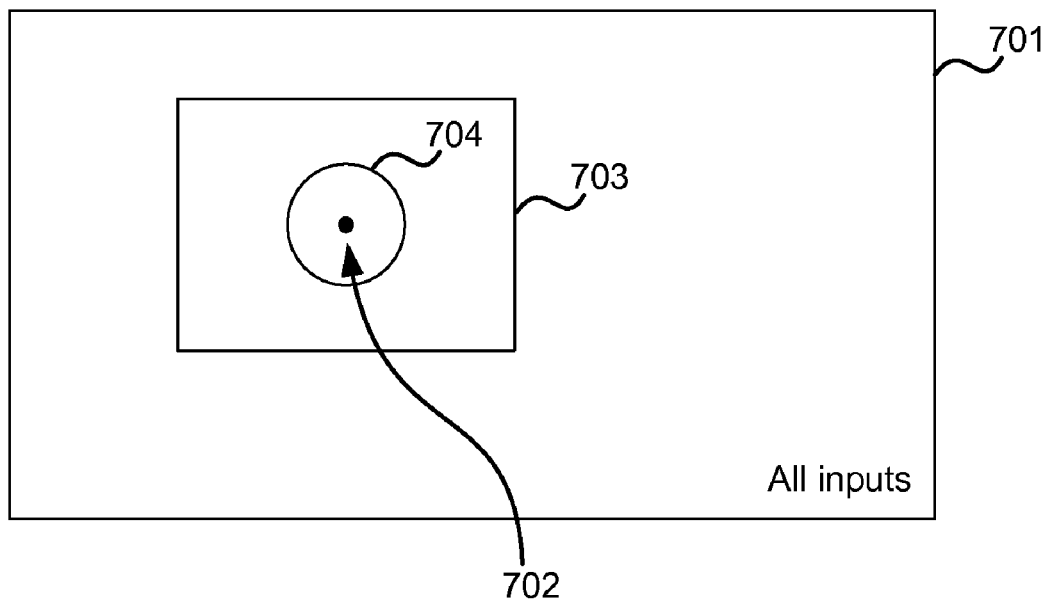
FIG. 7 is an example schematic representation of a privacy loss metric.

In a first example method of generating a privacy loss metric (block 601), the entropy of an error report may be measured by computing the set of byte strings with the same size as the original input that satisfy the path conditions. If this set contains a single byte string, the report reveals all the information about the original input. If the set contains two byte strings of length l, the report reveals l-1 bits. In general, if a fraction $\alpha$ of the byte strings having the same size as the original input satisfy the conditions, the error report reveals $-\log_2(\alpha)$ bits about the original input. This fraction, $\alpha$, is represented in FIG. 7 which shows a rectangle 701 which represents all possible inputs and a point 702 which represents the original logged input which resulted in the error. A smaller rectangle 703 represents all inputs having the same size as the original input and the circle 704 within this represents those inputs which have the same size and also satisfy the path conditions. The fraction, $\alpha$, is the size of the circle 704 divided by the size of the smaller rectangle 703.

Computing the value of $\alpha$ exactly may be expensive for large inputs and in many applications it may be beneficial to compute the metric quickly because the user waits for this value to decide whether or not to send the report. In such situations it may be useful to use approximations, such as upper bounds, or estimates to generate the privacy loss metric. When providing the metric to the user (in block 602) an indication may be provided to highlight whether the metric is an exact value, an upper bound etc.

Figure 8:
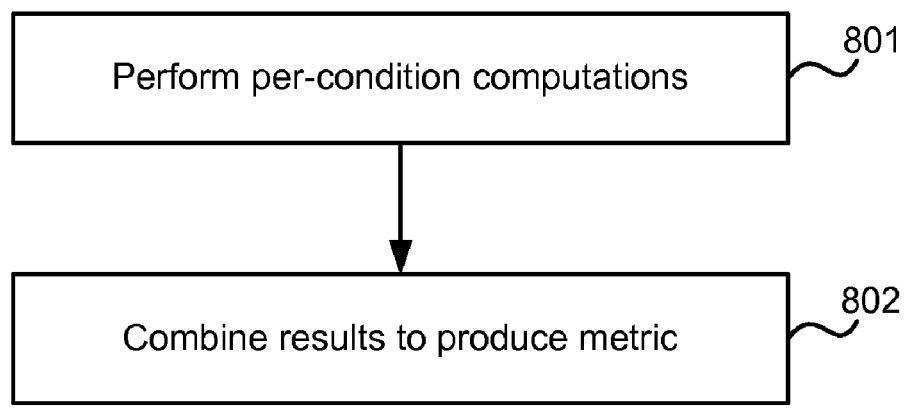
FIG. 8 is a flow diagram of an example method of generating a privacy loss metric.

In a second example method of generating a privacy loss metric, as shown in FIG. 8, an upper bound on the number of bits that are revealed is computed and in addition an upper bound on the number of bits revealed about each individual byte of the original input may also be computed to provide the user with additional information. The first step (block 801) computes the number of bits revealed by each individual path condition about the input bytes it references. For example, (=(bv-and x 1) 1) reveals one bit about x and (=x y) reveals eight bits about (x, y) because it holds true for 256 of the $256^2$ input pairs and $-\log_2(1/256)=8$. The second step (block 802) combines the results from the individual conditions to get the final metric. These two steps are described in more detail below.

Figure 9:
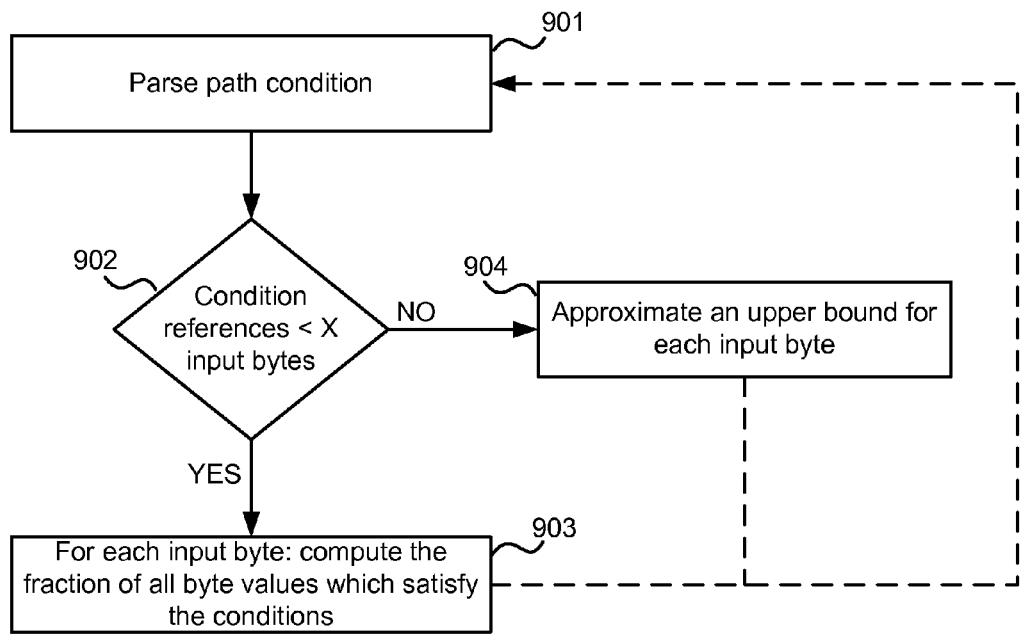
FIG. 9 is a flow diagram showing one of the steps of FIG. 8 in more detail.

FIG. 9 shows a flow diagram of an example method of computing the number of bits revealed by each individual path condition (block 801). The method parses the path conditions expressed in the language of the SMT solver (block 901). For conditions which reference less than a threshold number, X, of input bytes, the conjunction $G_i$ of all the conditions that reference only $b_i$ is computed for each input byte $b_i$ ('Yes' in block 902 and block 903). This is iterated over all possible byte values to compute the fraction $\beta_i$ that satisfy $G_i$, where $\beta_i$ is the fraction of all byte values which satisfy $G_i$, i.e. the equivalent of $\alpha$ on a per-input-byte basis. Condition $G_i$ reveals $-\log_2(\beta_i)$ bits about $b_i$.

Where X>2, the conditions that reference less than X input bytes ('Yes' in block 902) may be organized into groups of conditions (within block 903) so that each group still only references less than X input bytes. Some input bytes may be referenced by several groups. This can be explained with reference to the following example in which X=3 and three conditions are:

$(=x\ (f\ y))$ $(=y\ (f\ z))$ $(=z\ (f\ x))$ where f is an arbitrary function. All conditions cannot be put in the same group, because that group would reference three input bytes (and the condition that the group still references less than X input bytes would be broken). One possibility for organizing the conditions into groups is to create two groups such that the first contains the first two conditions, and the second contains the last condition.

There are many ways to group the conditions. In an example, all conditions that use the same unique input byte may be grouped together. All others go into a group that contains only themselves. It will be appreciated that this is just one example method of grouping conditions and other methods may be used instead.

As described, after organization each group, $G_i$, of conditions only uses input bytes in some set $B_i$, and each $B_i$ has size less than X. The ratio $\beta_i$ is then calculated for each group $G_i$ by evaluating the fraction of possible values of $B_i$. for which every condition in the group holds. Each condition is examined once: either by itself or as the member of one group.

This brute-force search (of block 903) may be suitable for conditions that reference a small number of input bytes. However, this brute-force search may be too slow for conditions that reference more than a small number of input bytes (e.g. more than two). In order to assist, the number of bits that are revealed by some common (complicated) patterns, such as the optimized code that looks for the end of a string, may be pre-computed. This computation may be performed ahead of time, so the program then only has to check whether the path condition it sees is the same as a pre-computed one, and if so it just uses the pre-computed answer. In addition (or instead) and for conditions that reference more than a small number of bytes ('No' in block 902), an approximation may be used (block 904).

Figure 10:
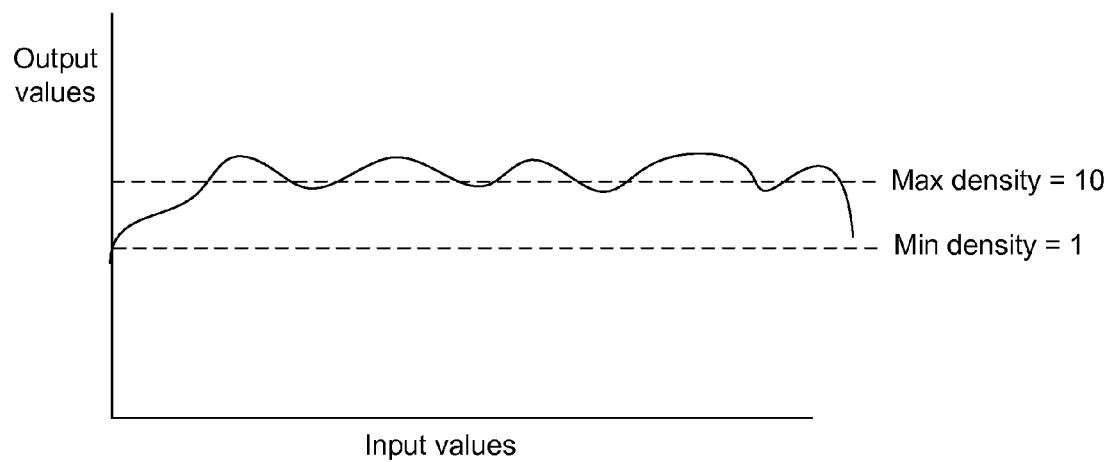
FIG. 10 is a schematic diagram illustrating the density of a function.

There are a number of different approximations which may be used. In a first example, given a condition of the form (op f(x) g(y)), the upper and lower bounds for the value of f and g and for their density are estimated. The density of a function for an input x is the number of inputs with the same image as x (i.e. the number of inputs which have the same resultant output of the function). FIG. 10 shows a graph which illustrates the density of a function. The function shown has a minimum density (min-dens) of 1 and a maximum density (max-dens) of 10, i.e. there are 10 different input values which all have the same output value of the function and some output values can only arise from one particular input value. In another example, the function h≡(x & 1), where x is a byte, has two images (i.e. two possible outputs): 0 and 1. Since both images have 128 preimages, min-dens(h)=128 and max-dens (h)=128. In a further example, the function h'≡(x & 1)+(x & 3) has three images: 0, 2, and 4. Since 2 has 128 preimages and 0 and 4 have 64 each, min-dens(h')=64 and max-dens(h') =128. A set of rules may be used to estimate lower and upper bounds and density for functions in the conditions. Additional rules may be used to compute an upper bound on the number of bits that are revealed when op is used to compare the two functions. For example if f maps 8-bit inputs to 8-bit images and g is a constant c, the condition (=f($b_0$) c) reveals at most $-\log_2$(min-dens(f)/256) bits about $b_0$.

When performing the approximation, initially all the functions that are just constant (e.g. (+1 1) may be simplified. Then min, max, min-dens and max-dens can be determined directly for functions that do not call other functions (e.g. just 'x'). These four values may be referred to as 'attributes'. Finally, for functions that call other functions, the attributes (min, max, min-dens and max-dens) of the functions may be determined based on the attributes of the inner functions (i.e. those functions which are called). For example, given:

(& (+x(+1 1)) 1)

This is simplified to:

(& (+x 2) 1)

This may be drawn as a tree rooted at &, with the leaves being: x, 2, and 1. The attributes for each leaf are then computed:

For '2', they are: min=max=2, min-dens=max-dens=256
For '1', they are: min=max=1, min-dens=max-dens=256
For 'x', they are: min=0, max=255, min-dens=max-dens=1

Going forward the actual values of these nodes are not considered and instead their attributes are considered. A set of attributes is referred to as a 'fuzz' and the process of combining attributes together on combining nodes is referred to as 'fuzzing'. Functions that combine these nodes together are now considered by looking at their attributes. The first such function is (+x 2). If [a,b,c,d] is used to denote a fuzz with the attributes min=a, max=b, min-dens=c and max-dens=d, what the computer sees can be written as:

(+[0,255,1,1][2,2,256,256])

For each operation, there are rules to combine the (fuzzed) arguments to create one big fuzz (i.e. a new attribute set). These are referred to as 'fuzzing rules' and are described in more detail below. In this case, the result is:

[0,255,1,1].

This is then repeated for the rest of the function, and in this example, the complete function is:

(& [0,255,1,1]1)

It can be seen that the function just computes the remainder of a division by two. Since what the function checks includes both an odd and an even number between its min and max, min=0 and max=1. Division by 2 multiplies the density by 128, so the end result of 'fuzzing' the expression is then: [0,1,128,128].

In a further approximation example, instead of keeping track of (min,max,min-dens,max-dens) over the whole range of possible inputs for the function, these may be computed separately for several ranges of input values. For example, using the approximation example above, the function (x+1) is approximated with:

(min=0;max=255;min-dens=max-dens=1)

which may be written as [0,255,1,1] for short, (the minimal value is 0 because all the values are mod 256, so 255+1=0). Instead, using this further approximation example, the following could be used:

(for 0<=x<128: [1,128,1,1]; for 128<=x<256: [0,255,1,1])

The choice of approximation is a trade-off between how much information is kept (resulting in a more accurate answer) versus how complicated the rules for computing, combining, and comparing these approximations are.

In an example implementation, the path conditions may be considered to form a tree structure and the conditions may be parsed from the leaves of the tree upwards and the attributes of each sub-tree are tracked. As described above, rules are used to combine these attributes with each other.

As described above, rules may be used to combine arguments, and examples of these rules can be described with reference to a path condition which is of the form (<test> <function> <constant>) or (<test> <constant> <function>), where <test> is either '=', 'signed-less-than', 'unsigned-less-than', or variants thereof. Function is an arbitrary function of the input bytes. These functions are 'fuzzed' (as described above) to convert them into a set of attributes: min, max, min-dens, and max-dens. Subsequently only these attributes are considered and not the functions themselves.

---

If <test> is '= constant', then a lower bound on α is:
min-dens / x if min ≦ constant ≦ max, and
0 otherwise, where x is 256 raised to the power of the number of input bytes in the equation and α is the fraction of inputs that satisfy the condition. The number of revealed bits is $-\log_2(\alpha)$. A lower bound on α is an upper bound on the number of revealed bits.

If <test> is 'unsigned-less-than constant', then a lower bound on α is:
  If min<constant: (min(constant,max+1) − min) * min-dens / x
  If min>=constant: 0 where x is 256 raised to the power of the number of input bytes in the equation. As mentioned above, a lower bound on α is an upper bound on the number of revealed bits. More detailed sets of rules and examples for 8-bit inputs and outputs are provided below.

Figure 11:
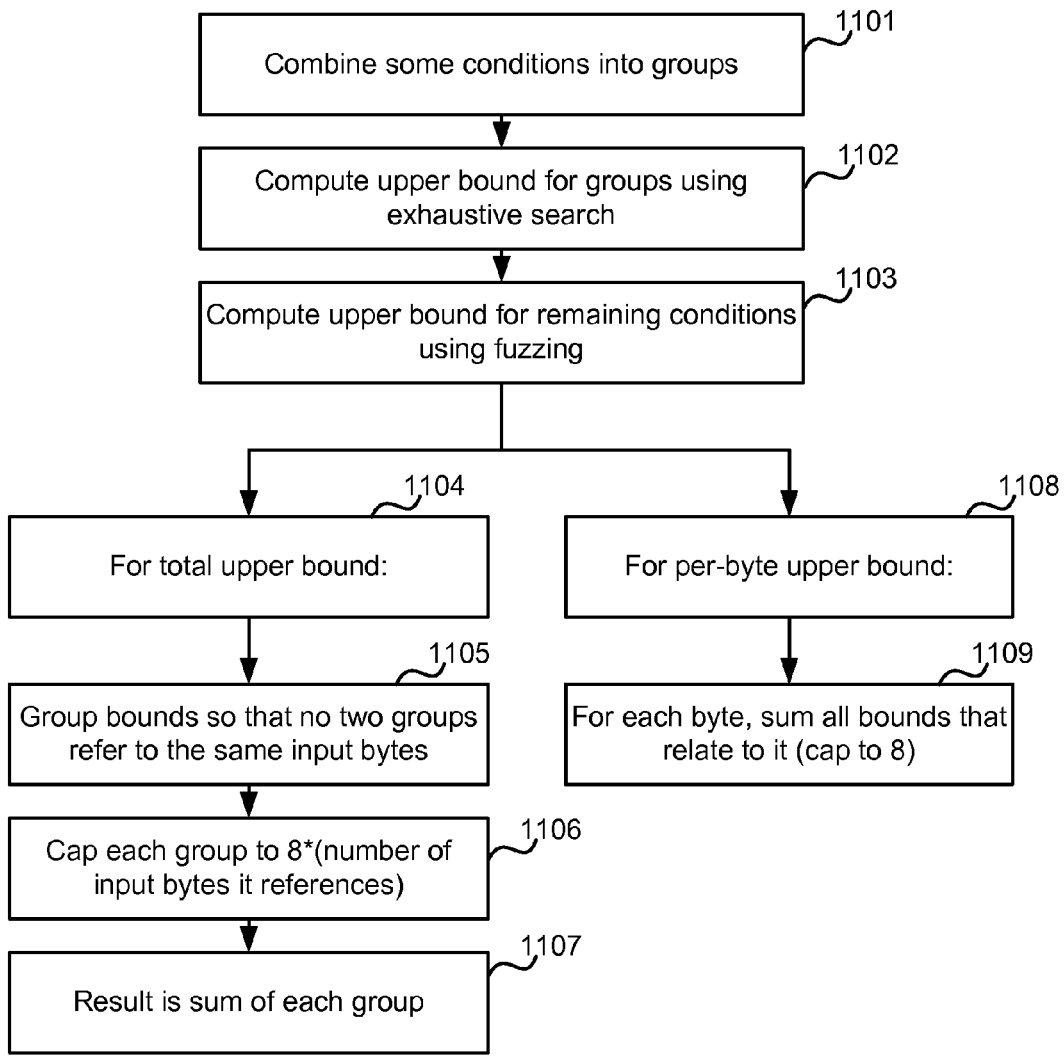
FIG. 11 is a flow diagram of another example method of generating a privacy loss metric.

In the second step (block 802), the results obtained in the previous step (block 801) are combined to compute upper bounds on the number of bits revealed by the error report for each input byte and for the whole input. The results may be combined differently for each type of upper bound and this is described in more detail below with reference to FIG. 11. As described above, (in the first step, block 801) some of the conditions are combined into groups (block 1101) and upper bounds on the number of revealed bits (i.e. lower bounds on α) are computed for groups using exhaustive search (block 1102) and for remaining conditions using 'fuzzing' (block 1103). The results from performing per-condition computations (block 801 of FIG. 8 and blocks 1101-1103 of FIG. 11) are: (i) for each group $G_i$, the corresponding number of revealed bits $L_i$, and (ii) for each condition $C_i$ not in any $G_i$, the corresponding number of revealed bits $L_i$ (where no group has the same index i as a condition, so $L_i$ is unambiguous).

A first metric is an upper bound on the total number of bits that are revealed (block 1104). To compute this, for each $G_i$ or $C_i$ the corresponding set of input bytes $B_i$ is considered. Some of these $B_i$ may have members in common and any two $C_i$ or $G_i$ that have any input byte in common are grouped together into a super-group (block 1105). This results in a set of super groups $SG_j$, each with a set of input bytes $SB_j$, where none of the sets of input bytes $SB_j$ intersect with any other. The number of bits revealed by each $SG_j$ is the sum of the $L_i$ for each group or condition i that is a member of $SB_j$, except that the number is capped at $8|SB_j|$, the number of bits in $SB_j$ (blocks 1106-1107). The upper bound on the total number of bits revealed is the sum of all the SBj.

A second metric is, for each input byte, an upper bound on the number of bits that are revealed about that particular byte (block 1108). To compute an upper bound on the number of bits that are revealed about a particular input byte b, the number of revealed bits $L_i$ from each condition $C_i$ or group $G_i$ whose $B_i$ includes b are summed (block 1109).

These two metrics are calculated differently because although it may be known how many bits are revealed, it may not be known (accurately) where these revealed bits are. This does not matter when computing the total, but in computing the per-byte metric, the number has to be used conservatively for every byte that the bits could possibly come from. As a result, the sum of the upper bounds on per-byte revealed bits, is higher than the upper bound on the total number of revealed bits.

This may be demonstrated in some examples. As described above, to compute an upper bound on the number of bits revealed for each input byte $b_i$, the number of bits revealed by $C_i$ and by other conditions that refer to $b_i$ are summed. The upper bound is equal to the minimum of the sum and eight bits. For example, the condition ($=b_i$, $b_j$) reveals eight bits about the pair ($b_i$, $b_j$). An upper bound of eight bits revealed for both $b_i$ and $b_j$ is computed because either input byte could be completely revealed if the other is known. In another example, the path conditions may reveal the following information about each input byte $b_i$:

| Variables in path condition | Number of bits revealed |
|---|---|
| $b_0$, $b_1$ | 4 |
| $b_0$ | 8 |
| $b_8$ | 1 |

The resultant upper bound on the number of bits revealed about each input byte $b_i$ is therefore:

| Variable | Upper bound |
|---|---|
| $b_0$ | 8 |
| $b_1$ | 4 |
| $b_8$ | 1 |

The upper bound on the number of bits that are revealed about the whole input could be computed by summing all the per-byte upper bounds, but this would be too conservative (as described above). Instead, the path conditions may be grouped where they have variables in common (into super-groups) and for each group the upper bounds may be summed, with the maximum value for each variable being 8. Where the sum for a group exceeds 8 multiplied by the number of variables in the group, the value is limited to 8 multiplied by the number of variables in the group.

The following example demonstrates a situation where the upper bound for the whole input is less than the sum of the per-byte upper bounds.

| Variables in path condition | Number of bits revealed |
|---|---|
| $b_0$, $b_1$ | 7 |
| $b_0$ | 8 |
| $b_1$ | 2 |
| $b_2$, $b_3$ | 7 |

The resultant upper bound on the number of bits revealed about each input byte $b_i$ is therefore:

| Variable | Upper bound |
|---|---|
| $b_0$ | 8 |
| $b_1$ | 7 |
| $b_2$ | 7 |
| $b_3$ | 7 |

Summing the per-byte upper bounds gives 29 bits, but this provides an over conservative figure. Summing the conditions gives 24 bits, but again this is over conservative. Grouping and capping gives two groups: ($b_0$,$b_1$) at 16 (the maximum number of bits for two variables) and ($b_2$,$b_3$) at 7. The sum of the values for these two groups is 23, which is the best metric which can be provided with the information available.

This may be implemented using an algorithm which creates an undirected graph with nodes for each condition that references more than one input byte and for each $C_i$. There is an edge in the graph linking pairs of conditions that have an input byte in common. For each connected component c of this graph, the parameter revealed$_c$ is computed by summing the bits revealed by each condition in c and taking the minimum of the sum and the number of bits in the input bytes referenced by conditions in c. The upper bound on the total number of bits that are revealed about the whole document is the sum of all revealed$_c$.

There are many other ways of solving the particular problem; each possible way of grouping the $C_i$ and $G_i$ results in an estimate of the upper bound although the values may be different (indicating a different degree of tightness of the upper bound). Depending on system constraints, the grouping method may be selected based on the desired or available calculation time. If more time is available to compute a tighter bound, several different groupings may be evaluated and the lowest upper bound used.

The following example demonstrates a method of calculating the tightest possible upper bound given the information available.

| Variables in path condition | Number of bits revealed |
| --- | --- |
| $b_0, b_1$ | 8 |
| $b_0$ | 5 |
| $b_4$ | 2 |

This can be rephrased as an optimization of a linear objective function, and standard linear programming tools may be used to solve it. The optimization problem for the example above would therefore be, with $x_i$ being the number of bits revealed about variable i:
  minimize sum($x_i$) under constraint:

$x_0 + x_1 \geq 8$ $x_0 \geq 5$ $x_4 \geq 2$

Since linear programs are normally defined as maximizations, the problem may be re-written in terms of $y_i = (8-x_i)$:
  maximize sum($y_i$) under constraint:

$y_0 + y_1 \leq 8$ $y_1 \leq 3$ $y_4 \leq 6$

In this form, the optimal grouping can be found by any linear programming (LP) package, for example Matlab®.

In an example, the algorithm may be used to compute upper bounds on the number of bits revealed by the example error report for the new input:
  GET . . .
as in the examples used earlier. The upper bounds are computed for each input byte and for the whole input. A tool may be implemented that prints a leak graph showing the upper bound on the number of bits revealed for each individual byte in the original input. The leak graph for our example error report is:
  GET . . .
where the first four bytes are entirely revealed and between 0 and 1 bit is revealed for the next 21 bytes. In an example leak graph, symbols indicate how many bits of each byte are revealed. In an example, the following symbols may be used: a dot, '.', (0-1 bit), a colon, ':', (2-3 bits), a hyphen (4-5 bits), a star (6-7 bits) or the actual revealed character (which may be in a different color) if all 8 bits of the character are revealed. The tool reports that an upper bound on the total number of bits revealed for the whole input is 32.2, which is precise in this case: eight bits for the first four bytes and $-\log_2(254/256)$ bits for the next 21 bytes because all byte values but 2 (i.e. 0x20 and 0xa, which correspond to space and '\n') satisfy the conditions on each of those input bytes.

Whilst the description above and FIG. 8 refer to performing both the computation of both a total number of bits revealed and per input byte values, in some embodiments only one of these metrics may be used.

Figure 12:
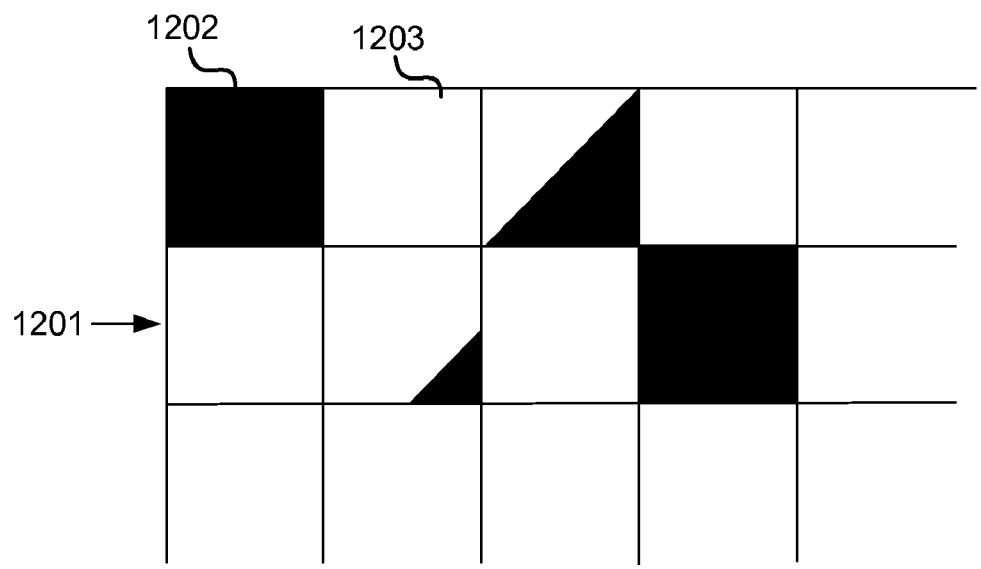
FIG. 12 shows an example portion of a document map.

There are many ways in which the metric may be displayed to a user (in block 602). In a first example, the numerical value(s) of the metric may be provided to the user. In other examples, the user may be provided with a document map which indicates the number of bits revealed for each byte in the input and also the position of the bytes in the document. An example portion of a document map is shown in FIG. 12 in which each cell 1201 represents an input byte and each cell is shaded according to the upper bound of the number of bits revealed. In this example, the all 8 bits of the first byte are revealed 1202 and none of the bits in the second byte are revealed 1203. Instead of shading, a figure may be provided in each cell denoting the upper bound of the number of bits revealed or in another example, a color coding scheme may be used. In another example, the metric may be represented graphically as a grid with a cell per input byte and with darker cells indicating more revealed bits.

The map of FIG. 12 may be used in combination with a document viewer which indicates words where more than a threshold number of bits are revealed, or such a document viewer may be used independently. The document viewer may in addition, or instead, highlight other items, such as the longest word which is totally revealed or the fraction of characters in a word which are revealed (e.g. using a color coded highlighting scheme).

Use of a document map or document viewer, such as described above, provides the user with a more intuitive representation of the amount of private information which might be disclosed if the generated error report was sent to the vendor of the faulty software. By providing detail, such as in the document viewer, a user may be able to determine whether any of the bits which are revealed actually contain any sensitive data or whether they only contain non-sensitive data.

Figure 13:
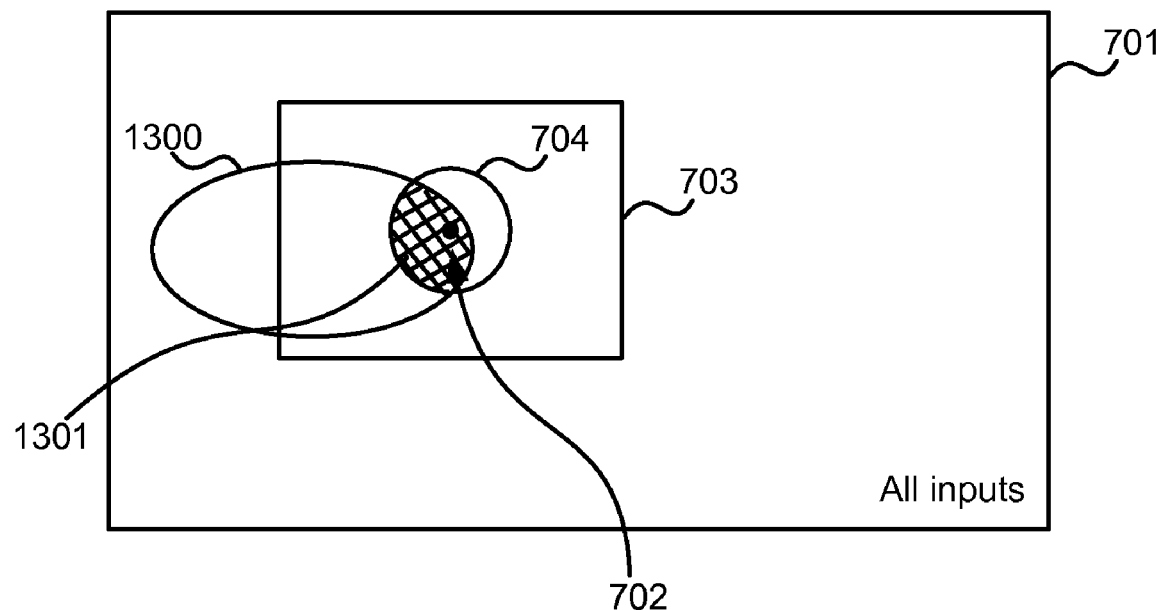
FIG. 13 is a second example schematic representation of a privacy loss metric.

The methods of generating a privacy loss metric described above provide a pure entropy measure. They do not take into account any input structure that may be known beforehand, e.g. if some byte strings are more likely to occur than others. The metric generated is application independent, which means that no application-specific knowledge about the probability of different inputs is required. However, if for a given application the a-priori likelihood of each byte string were known, these could be taken into consideration in generating the metric. In a simple extension to the example shown in FIG. 7, as shown in FIG. 13, if the ellipse 1300 indicates valid inputs to the particular application, the fraction α may be calculated as the shaded area 1301 (the intersection of circle 704 and ellipse 1300) divided by the intersection of the smaller rectangle 703 and ellipse 1300. In another example, a report revealing that the original input is one of a very rare set of inputs reveals more information than if the input were one of a set of the same size containing common inputs. Where application specific information is known, the metric may take into consideration those bits which, whilst revealed, may be standard and not contain any sensitive information. For example, if the bits which are revealed indicate that a file extension is '.doc' or '.docx', this information is unlikely to be sensitive or result in any loss of private information.

Whilst the methods are described above in relation to generating error reports, the methods may also be used to render an attack (i.e. a malicious input) innocuous in order that the attack could be further analyzed. The methods described above may be used to generate a new input which executes the same path as the original malicious input but does not contain the malicious content. The new input may be generated by the software vendor on receipt of the path conditions in an error report or alternatively by the user device (in block 201) and included within the error report.

Figure 14:
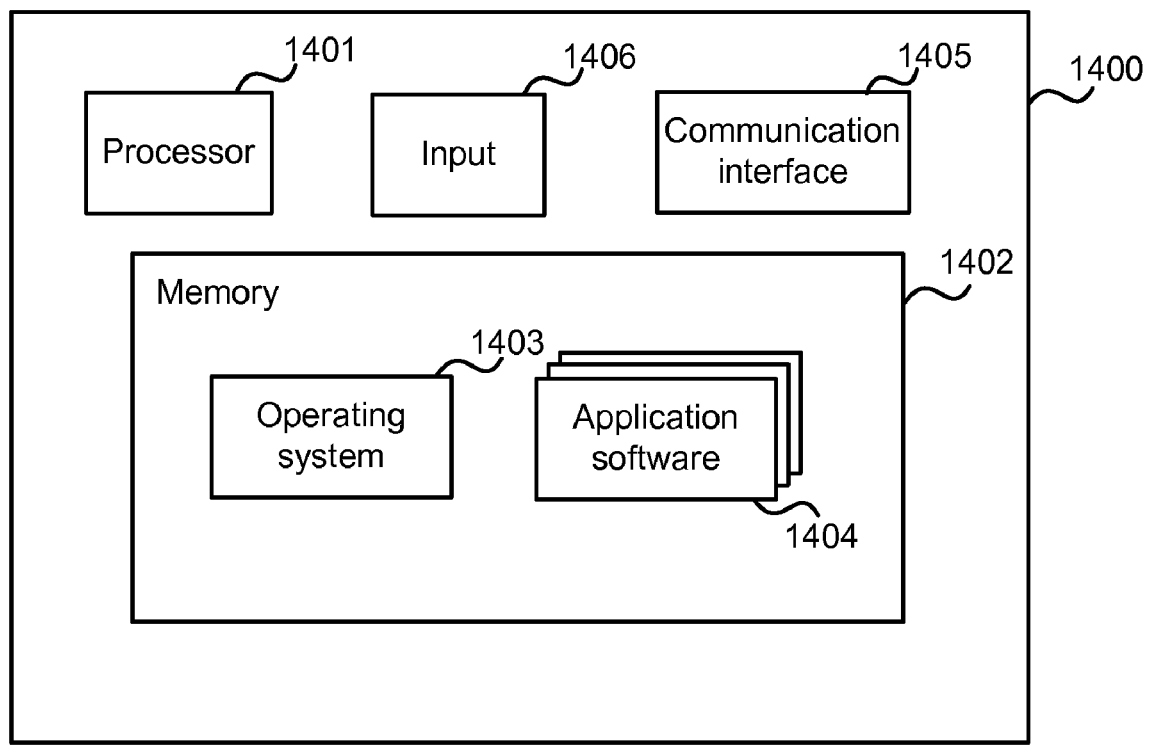
FIG. 14 illustrates an exemplary computing-based device in which embodiments of the methods described herein may be implemented.

The error report generation process may be run on the computing device on which the faulty program is operating. As described above, the generation of the new input may be performed either on this computing device or by the software vendor. FIG. 14 illustrates various components of an exemplary computing-based device 1400 which may be implemented as any form of a computing and/or electronic device, and in which embodiments of the methods of error report generation may be implemented.

Computing-based device 1400 comprises one or more processors 1401 which may be microprocessors, controllers or any other suitable type of processors for processing computing executable instructions to control the operation of the device in order to perform any aspects of the error report generation methods described herein. The computer executable instructions may be provided using any computer-readable media, such as memory 1402. The memory may be of any suitable type such as random access memory (RAM), a disk storage device of any type such as a magnetic or optical storage device, a hard disk drive, or a CD, DVD or other disc drive. Flash memory, EPROM or EEPROM may also be used.

Platform software comprising an operating system 1403 or any other suitable platform software may be provided at the computing-based device to enable application software 1404 to be executed on the device. This platform and application software, 1403, 1404, may be stored in memory 1402. The application software may comprise one or more of: the faulty software program, an attack detector (such as DFI) and a trace generator (such as Nirvana). The application software may also comprise an application for generating the privacy loss metrics, as described above.

The computing-based device 1400 comprise a communication interface 1405 of any suitable type for receiving media content, Internet Protocol (IP) input etc. The interface may be used to send the generated error reports to the software vendor and may be the means by which the inputs which cause the errors are received. The device may further comprise a display interface 1406 which provides an audio and/or video output to a display system integral with or in communication with the computing-based device. The display system may provide a graphical user interface, or other user interface of any suitable type although this is not essential. The display interface 1406 may be used to display the generated metrics to the user.

Where a portion of the methods described above and/or the subsequent analysis of the generated error report is implemented at the software vendor, they may also be implemented on a device similar to that shown in FIG. 14. In such an example, the communication interface 1405 may be used to receive the error reports, which may also be stored in memory 1402. The application software 1404 may include software for analyzing the error reports and where required for generating the new input from the path conditions contained within an error report.

Figure 15:
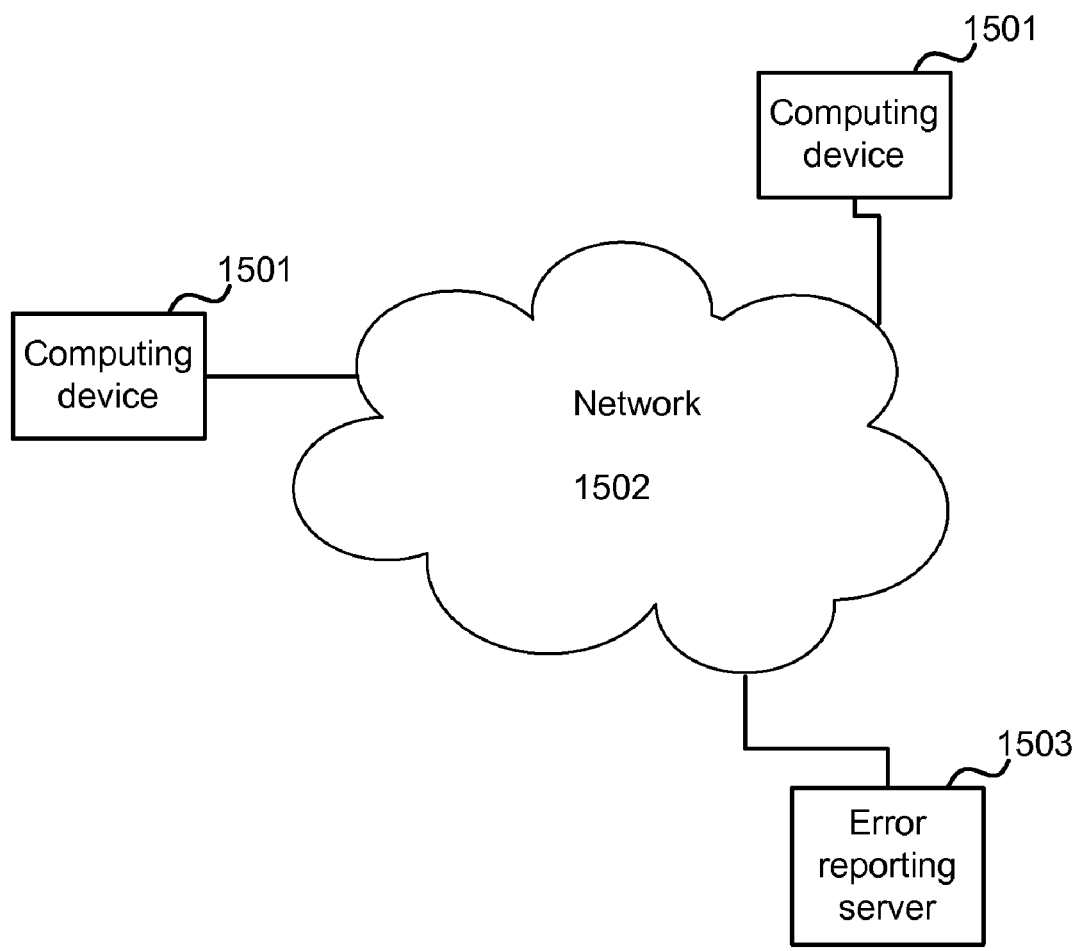
FIG. 15 is a schematic diagram of a system in which embodiments of the methods described herein may be implemented.

FIG. 15 shows an example system 1500 in which the error reports may be generated and transmitted. The system 1500 comprises one or more computing devices 1501 which may be running software developed by a software vendor. These devices may be any form of computer or computing device and may, for example, comprise a user's device or a server. The error report is generated at such a computing device 1501 on detection of an error in a software program. The computing devices 1501 may be connected (or connectable) to a network 1502 via which they may be able to send error reports to an error reporting server 1503 associated with the relevant software vendor. The error reporting server 1503 may store the error reports and may analyze the reports. Where the error reports contain path conditions and not details of an input which is capable of triggering the error, the error reporting server 1503 may generate the new input (e.g. as described above in relation to block 201).

Although the present examples are described and illustrated herein as being implemented in a system such as shown in FIG. 14 or 15, the system described is provided as an example and not a limitation. As those skilled in the art will appreciate, the present examples are suitable for application in a variety of different types of computing and networked systems.

Whilst the method of FIG. 2 described above refers to the generation of a single new input (in block 201), in some embodiments more than one new input may be generated. All the inputs will disclose the same amount of private data and therefore different inputs will have the same computed privacy metric.

Fuzzing Rules

In a more detailed example of a fuzz and fuzzing rules, a fuzz may contain seven attributes: min, max, min-range, max-range, homogenous, masked-homogenous, and variables. Min and max are lower and lower bounds on the value of the function represented by the fuzz. The range is the number of distinct images for the function. Min- and max-range are upper and lower bound estimates on the range. Variables is the set of input variables, e.g. x and y for f(x,y). A function is homogenous if every image has the same number of preimages. For example, $f(x)=(x+2)/2$ is homogenous. A fuzz is marked homogenous only if the function is homogenous (when unsure, it is not marked). A function is masked-homogenous if there exists a mask m and value v such that:

1. the set of images is exactly $\{x \& m | v: \text{for all } x\}$
2. each image has the same number of preimages All masked-homogenous functions are homogenous, but the converse is false. Also, all permutations maintain masked-homogeneity. A fuzz is marked masked-homogenous only if the function is masked-homogenous (when unsure, it is not marked).

In addition, the fuzz may contain two computed attributes: min-density and max-density. These may be computed as follows:

```
min-density( ):
    if (homogenous) then return input-count / max-range
    else return 1
max-density( ):
    if (homogenous) then return input-count / min-range
    else return input-count − min-range + 1
```

For fuzz f, the attributes may be accessed as follows:
f.l=min
f.h=max
f.lr=min-range f.hr=max-range
f.ld=min-density
f.hd=max-density
f.hom=homogenous
f.mh=masked-homogenous
f.vars=variables

[l,h,lr,hr,hom,mh] may be used to create a new fuzz concisely (vars is implicit). As an optimization, the actual value of max-range may be set to min(h−l+1, hr).

In the pseudocode below, the following symbols are used:

| |
|---|
| ^: power (e.g. 2^3 = 8) |
| &: bitwise and (e.g. 5&1=1) |
| \|: bitwise or (e.g. 5\|1=1) |
| ~: bitwise not (8-bits, so e.g. ~1=255) |
| &&: boolean and (e.g. true && false = false) |
| \|\|: boolean or (e.g. true \|\| false = true) |

The leaf rules may be:
constant c->[c,c,1,1,true,true]
variable x->[0,255,256,256,true,true]

For example, the constant 5 gets transformed into the following fuzz:
[5,5,1,1,true,true].

The fuzzing rules may then be as detailed below. In applying these rules, if a commutative function is given one constant argument, this is made the second argument.

```
(add f g):
    if (f.h + g.h > 255) then
        l := 0
        h := 255
        lr := max(f.lr/2, g.lr/2);
    else
        l := f.l + g.l
        h := f.h + g.h
        lr := max(f.lr, g.lr);
    if (f and g have variables in common) then
        lr := 1
    hr := min(f.hr * g.hr, 256);
    mh := (is-permutation(f) && is-constant(g))
        || (is-constant(f) && is-permutation(g))
    if (mh) then lr := hr
    hom := (f.hom && is-constant(g))
        || (is-constant(f) && g.hom)
        || (is-permutation(f) && is-permutation(g))
        || mh
    return [l,h,lr,hr,hom,mh]
(subtract f g):
    if (f.l − g.h < 0) then
        l := 0
        h := 255
        lr := max(f.lr/2, g.lr/2);
    else
        l := f.l − g.h
        h := f.h − g.l
        lr := max(f.lr, g.lr);
    if (f and g have variables in common) then
        lr := 1
    hr := min(f.hr * g.hr, 256);
    mh := (is-permutation(f) && is-constant(g))
        || (is-constant(f) && is-permutation(g))
    if (mh) then lr := hr
    hom := (f.hom && is-constant(g))
        || (is-constant(f) && g.hom)
        || (is-permutation(f) && is-permutation(g))
        || mh
    return [l,h,lr,hr,hom,mh]
(multiply f g):
    if (is-constant(g) && f.h * g.h < 256):
        l := f.l * g.l
        h := f.h * g.h
```

-continued

```
        mh := f.mh && g.l is a power of two
        return [l,h,f.lr,f.hr,f.hom,mh]
    else if (f.h * g.h < 256):
        l := f.l * g.l
        h := f.h * g.h
        lr := min(f.lr, g.lr)
        hr := min(f.hr * g.hr, 256)
        return [l,h,lr,hr,false,false]
    return [0,255,1,256,false,false]
(bitwise-and f g):
    h := min(f.h,g.h)
    l := 0
    max-newrange := 2 ^ max-number-of-bits-set(g)
    min-newrange := 2 ^ min-number-of-bits-set(g)
    max-d = 256/min-newrange
    if (is-constant(g)) then
        hr := min(f.hr, max-newrange)
    else
        hr := min(f.hr * g.hr, 256)
    if (f and g have no variable in common) then
        lr := f.lr / max-d
    else
        lr := 1
    mh := (f.mh && is-constant(g))
        || (g.mh && is-constant(f))
    return [l,h,lr,hr,mh,mh]
(bitwise-or f g):
    l := max(f.l, g.l)
    h := max-or(f.h,g.h)
    ldiv := 2 ^ min-number-of-bits-set(g)
    hdiv := 2 ^ max-number-of-bits-set(g)
    hnr := 256 / ldiv
    lnr := 256 / hdiv
    if (is-constant(g)) then
        hr := min(f.hr, hnr)
    else
        hr = min(f.hr * g.hr, 256)
    if (f and g have a variable in common) then
        lr := 1
    else
        lr := f.lr / hdiv
    mh := (f.mh && is-constant(g))
        || (g.mh && is-constant(f))
    return [l, h, lr, hr, mh, mh]
(bitwise-xor f g):
    if (is-constant(g)):
        l := f.l & (~g.l)
        h := max-or(f.h,g.h)
        return [l,h,f.lr,f.hr,f.hom,f.mh]
    if (f and g have no variable in common) then
        lr := max(f.lr, g.lr)
    else
        lr := 1
    hr = min(f.hr*g.hr, 256);
    hom := (f and g have no variable in common) and
        ( (g.mh && (is-permutation(f) || is-constant(f)))
        || (is-permutation(g) && (f.mh || is-constant(f))))
    return [0,255,lr,hr,hom,false]
(shift-left f g):
    if (!is-constant(g)): return [0,255,1,256,false,false]
    if g.l>=8:
        return [0,0,1,1,true,true]
    h := f.h << g.l
    if (f.h * 2 ^ g.l > 255):
        l := 0
        hom := false
    else
        l := f.l << g.l
        hom := f.hom
    mh := f.mh && hom
    if (g.l<8) then
        d := 2 ^ g.l & 255
        nr := 256 / d
        lr := f.lr / d
    else
        nr := 1
        lr := 1
    hr := min( f.hr, nr )
    return [l,h,lr,hr,hom,mh]
(shift-right f g):
```

-continued

```
        if (!is-constant(g)): return [0,255,1,256,false,false]
        if (2^g.l > f.h):
            return [0,0,1,1,true,true]
        h := h >> g.l
        l := l >> g.l
        hom := f.hom && (2^g.l <= f.l)
        mh := f.mh && hom
        if (g.l<8) then
            d := 2^g.l & 255
            nr := 256 / d
            lr := f.lr / d
        else
            nr := 1
            lr := 1
        hr := min( f.hr, nr )
        return [l,h,lr,hr,hom,mh]
```

End rules may be used that return the number of bits revealed about the variables that appear in the function. These may be defined as follows:

```
(equals f g):
    if (f.h<g.l) || (g.h<f.l) then expression is unsatisfiable
    if (both constant and equal) then return 0
    if (f and g have a variable in common) then
        return input-bits(f,g)
    leq := max(f.l, g.l)
    heq := min(f.h, g.h)
    minlhit := f.lr – max(f.h – heq, leq – f.l)
    minlhit := min(minlhit, heq – leq + 1)
    minrhit := g.lr – max(g.h – heq, leq – g.l)
    minrhit := min(minrhit, heq – leq + 1)
    inter := max(1, minlhit + minrhit – (heq – leq + 1))
    ic := input-count(f,g)
    accepted := max(1, min(inter * f.ld * g.ld, ic))
    return –log2( accepted / ic )
(not-equal f g):
    if (f.h < g.l) || (g.h < f.l) then return 0
    if (both constant and equal) then expression is unsatisfiable
    if (f and g have a variable in common) then
        return input-bits(f,g)
    leq := max(f.l, g.l)
    heq := min(f.h, g.h)
    accepted := input-count(f,g) – (heq – leq + 1) * f.hd * g.hd
    accepted := max(1, min(accepted, input-count(f,g)))
    return –log2( accepted / ic )
(unsigned-less-than f g):
    if (!is-constant(g)) then return input-bits(f,g)
    v := g.l
    if (f.h < v) then return 0
    if (f.l >= v) then expression is unsatisfiable
    wcRange := max(v – (f.h+1 – f.lr), 1);
    accepted := max(1, min(wcRange * f.ld, input-count(f,g)))
    return –log2( accepted / input-count(f,g) )
(unsigned-greater-than f g):
    if (!is-constant(g)) then return input-bits(f,g)
    v := g.l
    if (f.l > v) then return 0
    if (f.h <= v) then expression is unsatisfiable
    wcRange := max(f.l + f.lr – 1 – v, 1)
    accepted := max(1, min(wcRange * f.ld, input-count(f,g)))
    return –log2( accepted / input-count(f,g) )
```

Helper functions may also be defined as follows:

```
is-constant(f):
    return (f.l == f.h)
is-permutation(f):
    return (f.lr == 256 && |f.vars| == 1)
max-number-of-bits-set(f):
    if is-constant(f) then return number-of-bits-set(f.l)
    pick smallest x s.t. 2^x > f.h
    return x
min-number-of-bits-set(f):
    if is-constant(f) then return number-of-bits-set(f.l)
    if (f.l>0) return 1
    return 0
input-bits(f,g):
    return 8 * | f.vars union g.vars |
input-count(f,g):
    return 2^input-bits(f,g)
max-or(x,y):
    h := max(x,y)
    l := min(x,y)
    pick smallest z s.t. 2^z > l
    return h | (z–1)
```

The rules may be applied to the following example:

(&(+x(+1 1)) 1)

This is first simplified to:

(& (+x 2) 1)

Then:
(+x 2)->[0,255,256,256,true,true]
and (& [0,255,256,256,true,true] 1)->[0,1,2,2,true,true]
so that (=0 (& (+x 2) 1)) reveals 1 bit Conclusion The term 'computer' is used herein to refer to any device with processing capability such that it can execute instructions. Those skilled in the art will realize that such processing capabilities are incorporated into many different devices and therefore the term 'computer' includes PCs, servers, mobile telephones, gaming consoles, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments.

It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of generating an error report by a computing device of a user, the method comprising:
   detecting an error in a software program executing on the computing device of the user;
   responsive to detecting the error, computing a set of path conditions from an execution trace for the software program that is executing by performing forward symbolic execution on the execution trace to generate the set of path conditions, the performing symbolic execution on the execution trace to generate the set of path conditions comprising:
      computing symbolic values for storage locations that are data dependent on an input to the software program and computing concrete values for storage locations that are not data dependent on the input;
      executing instructions from the execution trace one at a time, the instructions being executed symbolically when they include at least one source operand that references a storage location with a symbolic value; and
      upon encountering a branch that is data dependent on the input, adding a path condition to the set to ensure that inputs that satisfy the set of path conditions follow the same path as the execution trace;
   computing a new input for the software program based on the generated set of path conditions, wherein the new input satisfies the set of path conditions by following the same path as the execution trace for the branch that is data dependent on the input; and
   generating an error report based on the set of path conditions.

2. A method according to claim 1, further comprising:
   on detection of the error while the software program is executing on the computing device of the user, replaying the software program to generate the error report without private information of the user.

3. A method according to claim 1, wherein computing a set of path conditions from an execution trace further comprises:
   analyzing the set of path conditions to remove unnecessary conditions.

4. A method according to claim 3, wherein analyzing the set of path conditions uses at least one of: bounds checking, data flow integrity enforcement and path slicing.

5. A method according to claim 1, wherein the error report comprises the set of path conditions.

6. A method according to claim 1, wherein the error report comprises the new input.

7. A method according to claim 1, wherein computing a new input comprises:
   inputting the path conditions into a solver, the solver comprising one of a Satisfiability Modulo Theories solver, a Boolean satisfiability (SAT) solver and a constraint solver; and
   receiving the new input as an output from the solver.

8. A method according to claim 1, further comprising:
   computing a privacy loss metric associated with the error report, the privacy loss metric indicating an amount of private user information that would be revealed by the error report to a recipient of the error report.

9. A method according to claim 8, further comprising:
   displaying the privacy loss metric to a user.

10. A method according to claim 8, wherein the privacy loss metric comprises an upper bound for the amount of private user information from an original input which is included in the error report.

11. One or more tangible computer readable media storing information to enable a computing device to perform a process, the process comprising:
    computing a set of conditions responsive to an input to a software program executing on the computing device, the set of conditions defining an execution path of the software program from receipt of the input to a point at which an error is detected by performing forward symbolic execution to generate the set of conditions, the performing symbolic execution to generate the set of conditions comprising:
       computing symbolic values for storage locations that are data dependent on an input to the software program and computing concrete values for storage locations that are not data dependent on the input;
       executing instructions one at a time, the instructions being executed symbolically when they include at least one source operand that references a storage location with a symbolic value; and
       upon encountering a branch that is data dependent on the input, adding a condition to the set to ensure that inputs that satisfy the set of conditions follow the same execution path;
    computing a new input for the software program based on the generated set of conditions, wherein the new input satisfies the set of conditions by following the same execution path as the branch that is data dependent on the input; and
    using the set of conditions to generate a report of the error.

12. One or more tangible computer readable media according to claim 11, wherein the process further comprises:
    on detection of the error, replaying the software program to generate an execution trace from receipt of an original input to the point at which the error is detected.

13. One or more tangible computer readable media according to claim 12, wherein computing a set of conditions comprises:
    performing forward symbolic execution on the execution trace.

14. One or more tangible computer readable media according to claim 11, wherein using the set of conditions to generate a report of the error comprises:
    generating an error report comprising the new input.

15. One or more tangible computer readable media according to claim 12, wherein the process further comprises:

computing a metric based on an amount of information from the original input which is contained in the report.

16. A computer-implemented method of generating an error report, by a computing device of a user, the method comprising:
   detecting an error in a software program during execution on the computing device;
   responsive to detecting the error, replaying the software program using a logged input to generate an execution trace from receipt of the logged input to detection of the error;
   generating path conditions based on the execution trace by performing forward symbolic execution on the execution trace to generate the path conditions, the performing symbolic execution on the execution trace to generate the path conditions comprising:
      computing symbolic values for storage locations that are data dependent on an input to the software program and computing concrete values for storage locations that are not data dependent on the input;
      executing instructions from the execution trace one at a time, the instructions being executed symbolically when they include at least one source operand that references a storage location with a symbolic value; and
      upon encountering a branch that is data dependent on the input, adding a path condition to ensure that inputs that satisfy the path conditions follow the same path as the execution trace;
   computing a new input for the software program based on the generated path conditions, wherein the new input satisfies the path conditions by following the same path as the execution trace for the branch that is data dependent on the input; and
   creating an error report based on the path conditions.

17. A method according to claim 16, wherein the error report comprises the path conditions.

18. A method according to claim 16, wherein creating an error report comprises:
   creating an error report comprising the new input.

19. A method according to claim 16, further comprising:
   generating a privacy metric indicative of an amount of user information revealed by the error report; and
   displaying the privacy metric to a user.

* * * * *